(12) United States Patent
Adduci, Jr. et al.

(10) Patent No.: US 7,343,334 B1
(45) Date of Patent: Mar. 11, 2008

(54) METHOD AND SYSTEM FOR PROVIDING A FINANCIAL ANALYSIS OF AN ENHANCED WIRELESS COMMUNICATIONS SERVICE

(75) Inventors: Richard I. Adduci, Jr., Elgin, IL (US); Parag P. Kothary, London (GB); Scott D. Liles, London (GB); Tunc Yorulmaz, London (GB)

(73) Assignee: Accenture LLP, Palo Alto, CA (US)

( * ) Notice: Subject to any disclaimer, the term of this patent is extended or adjusted under 35 U.S.C. 154(b) by 0 days.

(21) Appl. No.: 09/580,233

(22) Filed: May 26, 2000

(51) Int. Cl.
*G06Q 40/00* (2006.01)

(52) U.S. Cl. ............... 705/36; 705/7; 705/10; 705/35

(58) Field of Classification Search ............ 705/36, 705/35, 39, 38, 10
See application file for complete search history.

(56) References Cited

U.S. PATENT DOCUMENTS

| | | | |
|---|---|---|---|
| 5,006,998 A | | 4/1991 | Yasunobu et al. |
| 5,095,429 A | | 3/1992 | Harris et al. |
| 5,189,608 A | * | 2/1993 | Lyons et al. ............... 364/408 |
| 5,644,727 A | * | 7/1997 | Atkins ............... 395/240 |
| 5,794,207 A | | 8/1998 | Walker et al. |
| 5,875,437 A | * | 2/1999 | Atkins ............... 705/40 |
| 5,966,695 A | | 10/1999 | Melchione et al. |
| 6,064,984 A | * | 5/2000 | Ferguson et al. ............ 705/36 |
| 6,067,531 A | | 5/2000 | Hoyt et al. |
| 6,094,641 A | * | 7/2000 | Ouimet et al. ............... 705/10 |
| 6,298,123 B1 | * | 10/2001 | Nolting et al. ............... 379/111 |
| 6,324,395 B1 | * | 11/2001 | Khayrallah et al. ............ 455/406 |

OTHER PUBLICATIONS

Kotler, Philip & Armstrong, Gary. Principles of Marketing 8th Edition. Prentice Hall. Upper Saddle River, New Jersey. 1999. pp. 72, 98-99, 111, 139-140, 156-159, 196, 202, 204, 209, 212-213, 280-281, A1 & A4-A5.*
Weerahandi, Samaradasa & Moitra, Soumyo. Using Survey Data to Predict Adoption and Switching for Services. Journal of Marketing Research. vol. 32, iss. 1. Feb. 1995. pp. 85-96.*
Kroenke, David M. Database Processing: Fundamentals, Design & Implementation 6th Edition. Prentice Hall. Upper Saddle River, New Jersey. 1998. pp. 295-296.*

(Continued)

*Primary Examiner*—James Kramer
*Assistant Examiner*—Jason Borlinghaus
(74) *Attorney, Agent, or Firm*—Brinks Hofer Gilson & Lione

(57) ABSTRACT

A method and system for providing a financial analysis for enhanced wireless communication services provides a financial analysis for a service provider or another user interested in the provision of enhanced wireless communications services. The method includes accepting user input related to an existing wireless communications service and a proposed enhanced wireless communications service. A reference database is accessed for reference to general market data related to the proposed enhanced wireless communication service and a standard adoption curve for adoption of the enhanced wireless communication service. The standard adoption curve is adjusted to obtain an adjusted adoption curve based on the accepted user-specific input. A graphical depiction of a financial analysis is presented to the user based on an evaluation of the adjusted adoption curve and the general market data.

33 Claims, 12 Drawing Sheets

OTHER PUBLICATIONS

Townsend, Carl. Mastering Excel 4 for Windows. Sybex. Alameda, California. 1992. pp. 423-425.*

Raiborn, Cecily A., Barfield, Jesse T. & Kinney, Michael R. Managerial Accounting. West Publishing Company. St. Paul, Minnesota. 1993. pp. 362, 733 & 771.*

Heizer, Jay & Render, Barry. Operations Management 5th Edition. Prentice Hall. Upper Saddle River, New Jersey. 1999. pp. 143, 257 & 713.*

Kotler, Philip & Armstrong, Gary. Principles of Marketing 8th Edition. Prentice Hall. Upper Saddle River, New Jersey. 1999. pp. 98-114, 156-159, 196-215, 250-268, 274-294, 305-309, 320, 328-345 and A1-A14.*

Bohlin, Erik & Levin, Stanford L. Telecommunications Transformation: Technology, Strategy & Policy. IOS Press. Amsterdam, Netherlands. 1998. p. 15.*

Dorf, Richard C. The Technology Handbook CRC Press. Boca Raton, Florida. 1999. pp. 3-20-3-27.*

Porter, Alan; Roper, A. Thomas; Mason, Thomas W.; Rossini, Frederick A.; Banks, Jerry. Forecasting & Management of Technology. John Wiley & Sons. 1991. pp. 90-97.*

Mahajan, Vijay & Peterson, Robert A. Models for Innovation Diffusion. Sage Publications. Newbury Park, California. 1985. p. 8.*

Townsend, Carl. Mastering Excel 4 For Windows. Sybex. Alameda, California. 1992. pp. 387-397, 423-451 and 624-636.*

Finnerty, John D. Project Financing: Asset-Based Financial Engineering. John Wiley & Sons. New York, New York. 1996. p. 144.*

Heizer, Jay & Render, Barry. Operations Management 5th Edition. Prentice Hall. Upper Saddle River, New Jersey. 1999. pp. 139-176, 246-262 and 703-714.*

* cited by examiner

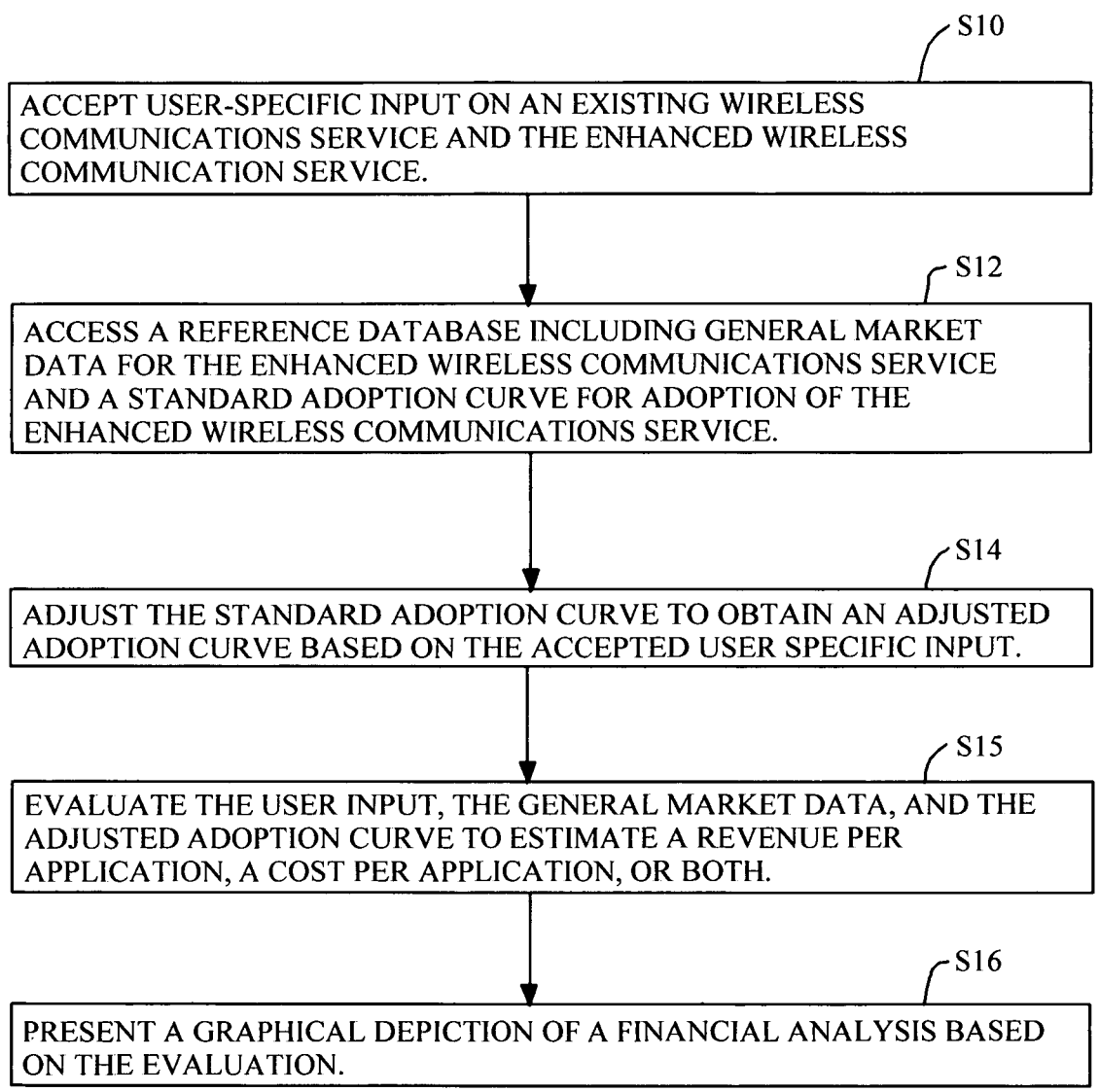

CASHFLOW PROJECTION

METHOD AND SYSTEM FOR PROVIDING A FINANCIAL ANALYSIS OF AN ENHANCED WIRELESS COMMUNICATIONS SERVICE

FIELDS OF THE INVENTION

This invention relates to a method and system for providing a financial analysis of an enhanced wireless communication service.

BACKGROUND OF THE INVENTION

Existing basic wireless communication services predominantly carry two-way voice traffic and, to a lesser extent, data traffic. Service providers of wireless communication services may contemplate providing enhanced wireless communications services that require additional bandwidth above and beyond that of existing basic wireless communications services. Enhanced wireless communications services may include providing mobile Internet access to mobile subscribers of a wireless communications system at higher data rates than are possible with basic wireless communications services.

The historical voice traffic patterns of existing basic wireless communications services are only of limited use in predicting the financial merits of an investment in enhanced wireless infrastructure. On one hand, certain enhanced wireless communications services may be competitive with two-way voice communications service, where the ultimate goal of the communications may be accomplished efficiently by either voice or data transmissions. On the other hand, enhanced wireless communications services may provide new or greater functionality for data-intensive applications that may find demand among a limited audience with specific needs. For example, enhanced wireless communications may include providing an employee with access to an employer's computer on a remote and mobile basis.

The service provider may face the task of deciding what enhanced wireless communication services to offer and whether or not to offer any wireless enhanced data services on a market-by-market basis. The requisite infrastructure to offer enhanced wireless communications service generally requires a substantial investment of capital. Without a prudent economic analysis, the service provider may encounter financial problems and unwanted market risk in offering enhanced wireless communication service. Thus, a need exists for a financial analysis system that facilitates an evaluation of the financial aspects of investing in wireless data infrastructure for delivering one or more enhanced wireless data services.

Basic wireless communications services predominately include voice communications services. Voice communications may be carried by analog modulated signals or digitally modulated electromagnetic signals. GSM (Global System for Mobile Communications), AMPS (Advanced Mobile Phone System), CDMA (Code-Division Multiple Access) and TDMA (Time-Division Multiple Access) support basic wireless communications services.

Basic wireless communications service may further include alphanumeric paging, short data messaging, or similar limited data transmissions that are integrally offered with two-way voice communications. For example, GSM supports short-messaging service (SMS) and access to the Internet via a modem. Short messaging service allows alphanumeric messages to be sent to a GSM-capable subscriber unit. Cellular digital packet data (CDPD) may be used to transmit short data messages over analog cellular systems, such as AMPS.

Basic wireless communications services support a lesser data transmission rate, a lesser maximum bandwidth, or a lesser maximum data throughput between a mobile subscriber station and a base station than does an enhanced wireless communications service. For example, second generation CDMA systems support data transmission of up to approximately 14 kbps. Enhanced wireless communications services can support data-intensive applications in a more rapid or responsive manner than otherwise possible with basic wireless communications services. Enhanced wireless communications service includes wireless data applications and wireless Internet services. General Packet Radio Service (GPRS) and Universal Mobile Telecommunications System (UMTS) are examples of enhanced wireless data services.

GPRS is a communications service that supports data-intensive applications over a GSM system. In one configuration, a GPRS subscriber may be provided with a channel that provides a theoretical maximum throughput of approximately 170 kilobits per second (kbps). Thus, service providers may consider GPRS a suitable technology for offering Internet access, remote access to central computing facilities, delivery of multi-media presentations, delivery of e-mails with substantial graphical or audio-visual content, or other data-intensive applications that consume greater bandwidth than voice communications do.

UMTS is a communications service that supports data-intensive applications over a CDMA system. In one configuration, a mobile UMTS subscriber may be provided with a channel that provides a theoretical maximum throughput of approximately 300 kbps, whereas a stationary UMTS subscriber may be provided with a theoretical maximum throughput of approximately 2 megabits per second (Mbps). UMTS is capable of supporting more elaborate communications services than those offered by GPRS including streaming content applications, which include real-time video monitoring, and music/multimedia delivery on-demand. Further, UMTS may support video-conferencing applications because of the greater available bandwidth offered by UMTS. UMTS may be considered a later-version of enhanced wireless communications services than GPRS because commercial deployment of UMTS is expected to follow the commercial deployment of GPRS.

The service provider may face many complex business decisions related to the offering of enhanced wireless communications services. Service providers may need to upgrade or purchase additional telecommunications infrastructure to offer enhanced wireless communications services or a later version of enhanced wireless communications services. For example, the service providers may purchase additional base stations that support enhanced wireless communications services or upgrade existing base stations. Service providers may need to purchase new telecommunications switches for packet switching. Many existing subscriber units used for basic wireless communications services presently do not support enhanced wireless communications services. Accordingly, service providers may need to market the sales of wireless communications devices (e.g., mobile phones) that support enhanced wireless communications services. Thus, a need exists for a financial analysis system that provides a financial analysis for tailoring a new or expanded offering of enhanced wireless data services in accordance with informed business judgment.

BRIEF SUMMARY OF THE INVENTION

In accordance with the invention, a method and system for providing a financial analysis for enhanced wireless communication services provides a financial analysis for a service provider or another user interested in the provision of enhanced wireless communications services. The method includes accepting user input related to an existing wireless communications service and a proposed enhanced wireless communications service. A reference database is accessed for reference to general market data related to the proposed enhanced wireless communication service and a standard adoption curve for adoption of the enhanced wireless communication service. The standard adoption curve is adjusted to obtain an adjusted adoption curve based on the accepted user-specific input. A graphical depiction of a financial analysis is presented to the user based on an evaluation of the adjusted adoption curve and the general market data.

The financial analysis system determines and organizes pertinent financial content based on the input of information that is readily ascertainable in immature or mature markets for enhanced wireless services. Further, the financial analysis system presents the financial analysis in a manner that facilitates a convenient comparison of the economic and statistical factors that may be used to make informed business decisions. For example, the financial analysis may be presented in a graphical format that allows ready comparisons to be drawn for alternative planned offerings of enhanced wireless communications systems. Accordingly, the service provider or user may use the financial analysis as a guide in making a well-informed business decision on providing enhanced wireless communications service, the appropriate market entry points for offering enhanced wireless communications service and/or financing the procurement of telecommunications infrastructure related to the provision of enhanced wireless communications service.

BRIEF DESCRIPTION OF THE DRAWINGS

FIG. 4 is a flow chart of a method for providing a financial analysis of an enhanced wireless communication service in accordance with the invention.

DETAILED DESCRIPTION OF THE PREFERRED EMBODIMENTS

Figure 1:
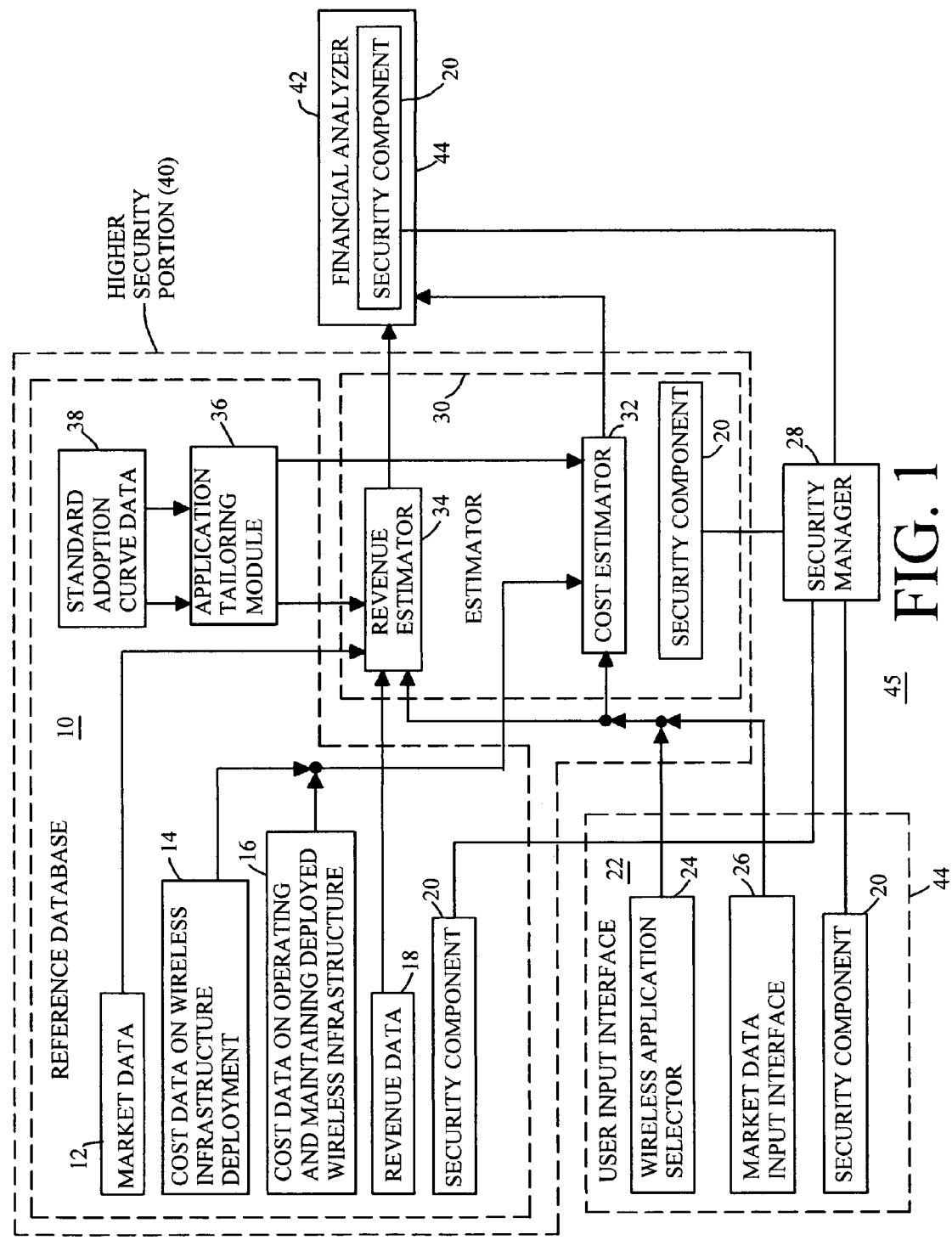
FIG. 1 is a block diagram of a system for providing a financial analysis of an enhanced wireless communication service in accordance with the invention.

The meanings of various terms used in the background applies equally to the following detailed description of the preferred embodiments. In accordance with the invention, FIG. 1 illustrates a block diagram of a system 45 for providing a financial analysis of an enhanced wireless communication service. The financial analysis system 45 of the invention represents a business planning tool to help the service provider or another user make prudent business decisions related to the offering of enhanced wireless communications services. In practice, the financial analysis system 45 may be realized as a computer with appropriate software instructions.

The financial analysis system 45 includes an estimator 30 that may communicate with a reference database 10, a user input interface 22, and a financial analyzer 42. The reference database 10 and the user input interface 22 provide input data to the estimator 30. The estimator 30 provides output data to the financial analyzer 42 based on an evaluation of the input data. The arrows and lines that interconnect the reference database 10, the user input interface 22, the financial analyzer 42 and other components of FIG. 1 may represent logical relationships among software instructions, physical interconnections among hardware components of a computer, or both.

A security manager 28 manages the degree of a user's access to the financial analysis system 45. For example, the security manager 28 may manage the degree of a user's access by controlling one or more security components 20. In one embodiment, a security component 20 represents software instructions that restrict or prevent the flow of data from one portion of the system 45 to an output device (e.g. graphical user interface), unless a correct password is entered into the system 45. Although the reference database 10, the user input interface 22, the estimator 30, and the financial analyzer 42 each have a security component 20 as shown in FIG. 1, in an alternative embodiment the distribution of security components 20 throughout the financial analysis system 45 may differ.

The security manager 28 may assign one or more levels of security to each security component 20. The financial analysis system 45 may include a higher security portion 40 and a lower security portion 44. The higher security portion 40 may include the reference database 10, the estimator 30, or both. The lower security portion 44 may include the user input interface 22, the financial analyzer 42, or both. For example, through the assignment of different security levels, the security manager 28 may limit a user's access to the reference database 10 and the estimator 30 independently or separately from the user's access to the user input interface 22 or the financial analyzer 42.

The user input interface 22 includes a wireless application selector 24 and a market data input interface 26. The wireless application selector 24 allows the user to select one or more wireless applications that are supported by a proposed enhanced wireless communications service. The user input interface 22 or the reference database 10 may store a library of wireless applications that are associated with corresponding enhanced wireless data services. The market data input interface 26 allows the user to enter information about an existing wireless communications service, which pertains to the geographic region of the proposed enhanced wireless service.

The reference database 10 generally contains reference data that form a background for use with user input and a technology adoption curve to provide a financial analysis. In one embodiment, the reference data refers to static data or coefficients that the user may be unable to manipulate or modify because of the security measures provided by the security manager 28. As shown in FIG. 1, the reference database 10 stores market data 12, cost data 14 on wireless infrastructure deployment, cost data 16 on operating and maintaining deployed wireless infrastructure, revenue data 18, standard adoption curve data 38, and an application-tailoring module 36.

The standard technology adoption curve data 38 represents an estimate of the commercial acceptance of enhanced wireless communications services after introduction within a marketplace. The standard adoption curve data 38 is communicated to an application-tailoring module 36. The application-tailoring module 36 may communicate with the estimator 30.

The estimator 30 includes a revenue estimator 34 and a cost estimator 32. The user input interface 22 provides input data to the cost estimator 32 and the revenue estimator 34. As shown in FIG. 1, the cost estimator also receives input data from the cost data 14 on wireless infrastructure deployment, the cost data 16 on operating and maintaining deployed wireless infrastructure, and the adjusted adoption curve via the application tailoring module 36. As shown in FIG. 1, the revenue estimator 34 also receives input data from the revenue data 18, the market data 12, and the adjusted adoption curve via the application tailoring module 36. The revenue estimator 34 and the cost estimator 32 are arranged for communication with the financial analyzer 42.

The financial analyzer 42 is preferably capable of accepting output data (e.g., financial evaluation) from the revenue estimator 34, the cost estimator 32, or both. The financial analysis system 45 may display the financial analysis or a portion thereof to a user in a graphical form. The graphical form may include charts, graphs, or other visual representations of the financial analysis.

In one example, the financial analyzer 42 may provide a display or graphical representation that represents volume of estimated traffic on the enhanced wireless system by market segment. In another example, the financial analyzer 42 may provide a financial analysis that includes a cost segment and a revenue segment. The cost segment includes investment (e.g., start-up costs) and maintenance costs for supporting the enhanced wireless services in the geographic region for the specified application or applications. The cost segment preferably includes sale costs, which may be subdivided into marketing costs for obtaining customers for the new wireless communications service and operational costs for maintaining existing customers. The marketing costs include advertising costs and promotional costs. The revenue segment includes sales by market segment and sales by application for evaluating which market segment or which application are key to business improvement and vitality.

The service provider may develop a strategy for deployment of enhanced wireless services based on the financial analysis provided by the method and system of the invention. The service provider may be able to reduce downside market risk by focusing capital on the most promising wireless applications, rather than a shot-gun approach to marketing wireless applications.

Now that FIG. 1 has been generally described, the reference database 10 is described in greater detail. The reference database 10 includes market data 12 related to the proposed offering of enhanced wireless communications services. The market data 12 defines a potential market for a proposed offering of enhanced wireless data service. The market data 12 may include demographic data and financial data related to the population or wireless subscriber population of a particular geographic region. A particular geographic region may represent a country or a portion thereof. For example, a particular geographic region may represent a city or a metropolitan area.

The demographic data may include one or more of the following items:

(1) the total population of a country or geographic region;

(2) the number or percentage of mobile communications subscribers of an existing wireless communications service in the geographic region;

(3) the number or percentage of adult members of the total population;

(4) the number or percentage of youth members of the total population;

(5) the number or percentage of adult subscribers to an existing mobile communications service in the geographic region;

(6) the number or percentage of youth subscribers to an existing mobile communications service in the geographic region;

(7) the coverage area and voice or data services offered by an existing wireless communications service; and (8) the number of corporate, mid-size, and small companies located in a given country, wherein the size of the companies are ranked by market capitalization, sales volume, number of employees, profitability, or by some other metric.

Market data 12 may be used to classify countries into different classifications based on the economic and demographic characteristics of the countries. For example, one group of countries may include Western European nations that meet a certain economic indicator, such as per capita income. Another group of countries may include Eastern European nations, such as former Soviet block countries, that fall below the certain economic indicators, such as per capita income.

The cost data 14 on wireless infrastructure deployment may provide an estimate of the costs for offering a proposed enhanced wireless system based on a scale or scope of an existing wireless communications infrastructure. The existing wireless communications service may comprise a basic wireless communications service, an earlier version of an enhanced wireless communications service, or an earlier deployment of a same-generation enhanced wireless communications service. The cost data 14 on wireless infrastructure deployment may include one or more of the following items:

(1) the number of cells in an existing wireless communications service in the same geographic region where enhanced wireless communications service is proposed or in an economically analogous region;

(2) the number of active subscribers or calls that an existing communications service handles during a certain time period or group of time periods;

(3) the historical volume of traffic that an existing communications service handles during a certain time period or group of time periods; and (4) the volume of projected traffic over the proposed enhanced wireless system given the current volume of voice traffic or voice plus data traffic carried by the basic wireless communications service in the same geographic region where enhanced wireless communications service is proposed or in an economically analogous region.

The cost data 14 may assume sharing of existing equipment between an existing wireless communications service and a proposed enhanced wireless communications service in a particular geographic region. For example, equipment shelters, towers, equipment racks, power supplies, air-conditioning, and heating systems may be shared to maximize the economic efficiency of offering the enhanced wireless service in a geographic region with the facilities for an existing basic wireless communications service. If technically feasible, a basic wireless communications service and an enhanced wireless data service may share transmission line, filters, receiver multi-couplers, antennas, or any combination of the foregoing components. Such technical feasibility will depend on the licensable frequencies that are available for the basic wireless communications service and the enhanced wireless communications service, among other factors.

Cost data 16 on operations and maintaining deployed wireless infrastructure may be based on historical costs of maintaining an existing wireless communications service in a particular geographic area. Such costs may be expressed as a maintenance cost per site, a maintenance cost per currency unit of infrastructure, a maintenance cost per unit of traffic volume over the existing wireless communications service, or another metric.

Besides cost data, the reference database 10 includes revenue data 18 from an existing wireless communications service. The revenue data 18 from the existing wireless communications service provides some basis for predicting the revenue data 18 from an enhanced wireless communications service. Further, the user's selection of a particular wireless application from the library of applications may determine what revenue streams are applicable, preferential, allowable, or prohibited for the particular wireless application. The possible revenue streams include advertising revenue, subscription revenue, air-time usage, and metered transmission of data packets. Each particular wireless application may be associated with allowable and/or preferential revenue streams.

Figure 2:
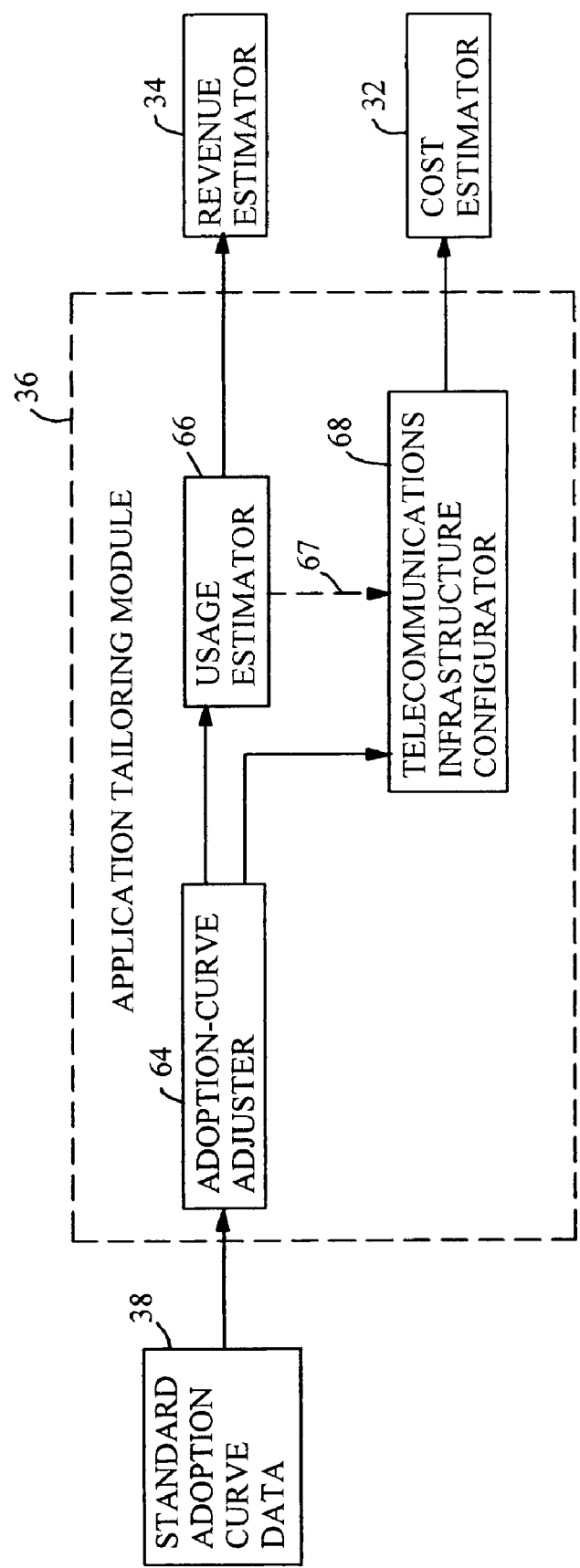
FIG. 2 is a block diagram showing an application tailoring module of FIG. 1 in greater detail.

FIG. 2 is a block diagram, which shows the application-tailoring module 36 in greater detail than FIG. 1. The application-tailoring module 36 includes an adoption curve adjuster 64 that communicates with a usage estimator 66 and a telecommunications infrastructure configurator 68. In turn, the usage estimator 66 communicates with the revenue estimator 34, and the infrastructure configurator 68 communicates with the cost estimator 32. The usage estimator 66 provides an estimated usage in terms of the number of estimated subscribers of the enhanced wireless service, the estimated traffic usage by the potential subscribers of the enhanced wireless service, or otherwise. The infrastructure configurator 68, preferably indicates the size and scope of telecommunications infrastructure (e.g., wireless equipment) that is needed to support the estimated usage. The infrastructure configurator 68 may indicate the size and scope in terms of a desired traffic handling capacity of the wireless infrastructure, the telecommunications infrastructure, or both. The usage estimator 66 may provide an input to the wireless infrastructure configurator 68 as indicated by the dashed line, labeled reference number 67, in FIG. 2.

The standard adoption curve data 38 represents a measure of consumer demand and acceptance of a new technology. A standard adoption curve representation, stored within the reference database 10, may be associated with a corresponding geographic region (e.g., country) of the market for the planned offering of enhanced communications services. Accordingly, the standard adoption curve data 38 within the reference database 10 may include one standard adoption curve for each corresponding geographic region.

The standard adoption curve data 38 may be defined in accordance with several alternate techniques. Under a first technique, the standard adoption curve data 38 may be stored in the form of a database or at least one look-up table. The database may include numbers of estimated subscribers of the enhanced wireless communications services associated with corresponding times (e.g., intervals). Similarly, the database may include an estimated percentage of the population or market share of a wireless market associated with corresponding times (e.g., intervals).

Under a second technique, the adoption curve data 38 may be stored as a graph of number of subscribers of enhanced wireless communications services versus time from a reference time (e.g., time of introduction of enhanced wireless communications services to a geographic region). The vertical axis may represent the number of subscribers of enhanced wireless communications as a percentage of the total population, or otherwise. The horizontal axis may represent the time on a yearly basis, a monthly basis, or some regular interval after the introduction of the enhanced wireless service.

Under a third technique, the adoption curve may represent an area on the graph of the second technique that is bounded by a lower limit (e.g., a lower adoption curve) of subscribers versus time and a higher limit (e.g., a higher adoption curve) of subscribers versus time.

The application tailoring module 36 may adjust the standard adoption curve, or otherwise provide an adjusted adoption curve, to suit the specifics of the business parameters at hand, as expressed through preferences of the user. The adoption curve adjuster 64 establishes an adjusted adoption curve by modifying the standard adoption curve data 38 or by retrieving an adjusted adoption curve from a storage device associated with the application tailoring module 36. Each wireless application may be associated with a corresponding adjusted adoption curve, based on an adjustment or refinement of the standard adoption curve. The adjusted adoption curve data is preferably stored in the reference database 10.

The enhanced wireless communications service may support various wireless applications. For example, such wireless applications may include content-based applications, access to tool applications, and applications other than voice communications. Within the reference database 10, each application may have an application identifier affiliated with a corresponding adjusted adoption curve representation.

The application tailoring module 36 estimates the usage rate of the enhanced wireless communications services based on the adjusted adoption curve for each corresponding application. The usage rate may represent the number of subscribers of enhanced wireless communications services or the traffic demand for enhanced wireless communications service. If the wireless data service is used to support multiple different applications, the contribution of subscribers or users from each different application may be aggregated to obtain a total usage rate for the enhanced wireless service.

The usage estimator 66 and the infrastructure configurator 68 cooperate to estimate the size of the telecommunications infrastructure requirements necessary to support the subscribers of the enhanced wireless communications service or applications supported by the enhanced wireless communications service. The infrastructure configurator 68 bases the size of the wireless infrastructure requirement upon the total usage rate determined by the usage estimator 66.

In one embodiment, the usage estimator 30 estimates the spill-over traffic demand of the basic wireless communications system. The spill-over traffic demand may result from subscribers of the enhanced wireless communications service that also subscribe to the basic wireless communications service for the same geographic region. The infrastructure configurator 68 may increase the capacity or size of the infrastructure for the basic wireless communications service (e.g., GSM infrastructure) to handle increased ancillary voice traffic from the enhanced wireless service (e.g., GPRS).

In one embodiment, the cost of the additional infrastructure for the enhanced wireless communications service (e.g., GPRS) is based on sharing existing equipment of the existing communications system (e.g., GSM) to the maximum extent possible to gain economies of scale for deployment of the enhanced wireless communications service. In an alternate embodiment, the service provider may elect not to or may not be able to share equipment, between a basic wireless communications service and an enhanced wireless communications service, because of technological constraints among other reasons. The size of the telecommunications infrastructure necessary to support enhanced wireless communications service may be used to determine support infrastructure for providing technical assistance, maintenance and operations service.

Figure 3A:
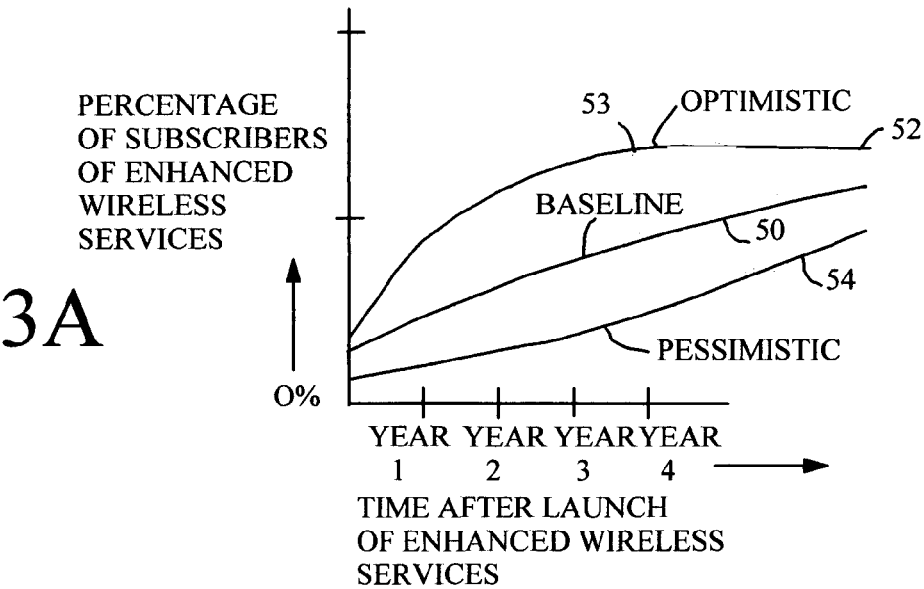
FIG. 3A-FIG. 3C show various charts of technology adoption curves related to market acceptance of enhanced wireless communications service in accordance with the invention.

FIG. 3A illustrates a standard adoption curve. The standard adoption curve may be defined as a baseline adoption curve 50, a pessimistic adoption curve 54, an optimistic adoption curve 52, a range of adoption curves bounded by the optimistic adoption curve 52 and the pessimistic adoption curve 54, or otherwise. A vertical axis of FIG. 3A represents a percentage of subscribers out of the total number of subscribers in a geographic region that use enhanced wireless communications services. The horizontal axis of FIG. 3A represents a time after launch of the enhanced wireless services in the geographic region. As shown, the optimistic curve 52 increases from year to year after the launch and then tapers off at a saturation point 53 or knee in the curve. The saturation point 53 or knee in the curve occurs where the curve has or approaches a slope of zero, rather than a positive slope. The slope may be defined as the tangent of the angle that at least one segment of an adoption curve makes relative to the horizontal axis or to a line parallel thereto.

The service provider may plan to subsidize a new subscriber's costs of a mobile communications device for subscribing to the basic wireless communications service, the enhanced wireless communications service or both. If the service provider subsidizes the subscribers purchase of a mobile communications device that supports enhanced wireless communications services, the applicable adoption curve may change. For example, the adoption curve may be changed to a more optimistic curve.

The service provider may plan to introduce a later version (e.g., next generation) of the enhanced wireless service after the introduction of an earlier version of the enhanced wireless service. The later version tends to make at least some of the applications of the earlier version of the enhanced wireless communications services obsolete or to change the applicable adoption curve. Although the shape of the standard adoption curve may vary on regional basis or a country-by-country basis, the slope of the adoption curve is preferably positive, or increasing with the passage of time.

Figure 3B:
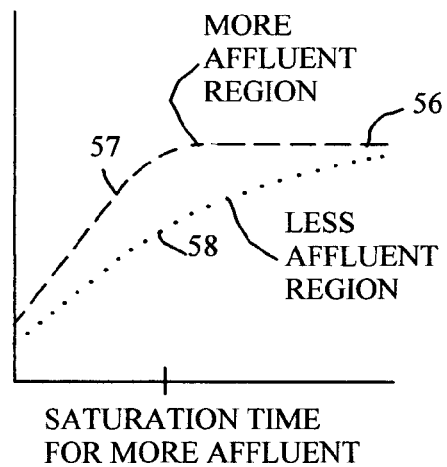

In FIG. 3B, a graph illustrates two adoption curves (56, 58) to demonstrate the variation that may occur in the standard adoption curves where the adjusted adoption curves vary from geographic region to region. One adoption curve 56, illustrated by the dashed lines, tends to show the technology adoption in a more affluent region. In contrast, the adoption curve 58, shown as the dotted line, shows the adoption curve of technology in a less affluent region. A less affluent geographic region may be distinguished from a more affluent geographic region on the basis of per capita income, or other economic factors.

The foregoing adoption curves of FIG. 3B represent the adoption of the same application or the same groups of applications in different geographic regions. The slope of the adoption curve 56 for the more affluent region is generally greater than the slope for the less affluent region. The steeper slope indicates technology is more quickly adopted in a more affluent region. Because the more affluent region may quickly adopt technology, the adopted technology has a tendency to be supplanted more quickly than in a less affluent region. Accordingly, the more affluent region may have a lower saturation point 57 for technology adoption than a less affluent region, which may not have a defined saturation point because of limited growth in adoption of the technology.

Figure 3C:
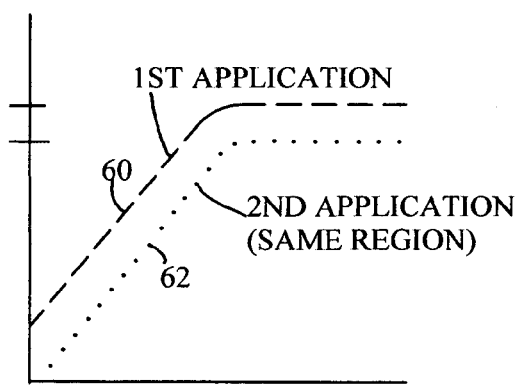

In FIG. 3C, applications of enhanced wireless services are introduced into the same region where the demand for the applications may differ because of the particular service offered. Accordingly, the curve 60, represented by dashes, for a first application may mimic the curve 62, represented by dots, of a second application where the commercial acceptance of the first application exceeds the commercial acceptance for the second application.

FIG. 4 shows a flowchart of the method for providing a financial analysis for a proposed offering of enhanced wireless communication service in accordance with the invention. The method of FIG. 4 starts in step S10.

In step S10, a user enters available input data, into a user interface 22, that relates to the provision of enhanced wireless communication sources. For example, the financial analysis system 45 accepts user-specific input on an existing wireless communication service and a proposed enhanced wireless communication service. The financial analysis system 45 accepts input of information that is readily ascertainable even in immature markets for enhanced wireless services. Available input data may include one or more of the following items:

(1) input data on an earlier deployment of same-generation enhanced wireless communications system in the same geographic region or an economically analogous geographic region;

(2) input data on an existing basic wireless communications service in the same geographic region or an economically analogous geographic region; and (3) input data on an earlier version (e.g., earlier generation) of a wireless communications service in the same or economically analogous geographic region.

The user-specific input of an existing wireless communication service may include market data 12 and the selection of one or more wireless applications. The market data 12 may include the market share of a service provider of the existing wireless communication service in the geographic region, the growth rate of the market share, or other factors that may indicate the potential market share of the enhanced wireless communication services in a particular geographic region.

The user-specific input on the enhanced wireless communication service may include the user selecting an application from a library of applications, which the enhanced wireless communication service supports. The service provider preferably selects wireless applications that will be offered or are contemplated as part of the proposed enhanced wireless services.

In general, the library of wireless applications are divided into a consumer group and a business group. The consumer wireless applications include one or more of the following: mobile portal, personal information management (PM), universal messaging (UM), electronic banking, electronic brokerage, Global Positioning System (GPS) services, information request, enhanced messaging, instant messaging, location-based information (LBI) services, ticketing service, auctioning service, mobile internet, a user-definable consumer application, or a variant of the foregoing applications. A mobile portal provides a user with access to a computer or a computer network through the enhanced wireless communications system. PM includes functions similar to those supported by a palm computer or personal digital assistant. Universal messaging allows faxes, e-mails, and other electronic message forms to be gathered and placed in one spot. Electronic banking and electronic brokering may be supported through mobile Internet access or otherwise. The GPS service provides information on the location (e.g., geographic coordinates) of the mobile station subscribing to the enhanced wireless communications service. Information request may provide travel assistance or customer service as a convenience to mobile subscribers who might not otherwise have access to directions, travel assistance, or appropriate customer service. Instant messaging service allows mobile subscribers to communicate with other mobile subscribers or wireline users by sending alphanumeric messages or other messages in real-time. LBI services use information concerning the relative location of a user to determine the content of the information provided to the user. For example, if a user requests a list of restaurants using LBI services, the user would receive a list of restaurants located within some pre-defined distance from the user's current position.

The business wireless applications include one or more of the following: mobile customer relationship management (CRM), mobile sales force automation (SFA), mobile field service, fleet management, corporate portal, mobile internet, enhanced messaging, corporate radio, mobile intranet, mobile thin client, or a user-definable business application. Mobile customer relationship management remotely provides users with information concerning their customer base. For example, a user of mobile CRM services could access his corporate information system to determine what a customer had ordered for the past six months. Mobile sales force automation enables users to execute sales transactions, which today normally require access to corporate computing resources via a personal computer. Mobile SFA application functionality may include ability to check item availability, place orders, or check order status. Mobile field service applications allow field service teams to manage their workloads remotely. Mobile field service functionality may include ability to review work queues, ability to select work tickets in work queues for completion, ability to view work ticket information, ability to close work tickets, ability to route work tickets to other service professionals for action. Fleet management (e.g., dispatching services) are communications resources that support one-way communications, two-way communications, or both between two or more users. Further, fleet management may organize users into communications groups for multi-party communications. A corporate portal provides access to a corporate computer or computer network via the enhanced wireless communications services. Corporate radio represents resources that support two-way communications among different corporate users or groups of users. Corporate radio may provide such communications services as trunking or paging that might otherwise be provided over a private wireless system of a corporation. Mobile intranet provides mobile access to a corporation's intranet resources via the enhanced wireless communications system. Mobile Internet provides mobile access to the Internet via the enhanced wireless communications system. A mobile thin client allows a mobile communications device to function as a client with respect to a server via the enhanced wireless communications system. The functionality of the mobile thin client depends upon the extent that the mobile communications device has processing resources and appropriate software.

In one example, the user inputs one or more of the following input data into the user interface:

(1) the geographic region (e.g., country) in which the offering of enhanced communications service is planned;

(2) the market share of a service provider, where the service provider offers an existing basic wireless communications service in the geographic region;

(3) the growth or reduction rate of the market share of the service provider in the geographic region;

(4) the presence or absence of subsidies of basic wireless services or affiliated products;

(5) a time span following the introduction of the enhanced wireless communications service (e.g., GPRS) after which the newer version of enhanced wireless communications service (e.g., UMTS) may be introduced by the service provider or a competitor thereof;

(6) a real discount rate associated with the service provider, where the discount rate reflects return that equity investors in the service provider may require to justify the amount of their investment in the basic wireless communications service, enhanced wireless communications service, or both;

(7) annual inflation rate within the country in which the offering of the enhanced communications service is planned;

(8) total number of base stations for the basic communications service (e.g., GSM); and (9) growth rate of the basic communications services (e.g., voice over GSM).

In step S12 after step S10, the financial analysis system 45 accesses a reference database 10, including general market data 12 for the enhanced wireless communication service and standard adoption curve data 38 for technology adoption of the enhanced wireless communication service. The general market data 12 may include demographic information on the geographic region in which the deployment of the enhanced wireless communication services planned. The standard adoption curve for data 38 technology adoption of the enhanced wireless communication service may be based on empirical studies or research conducted in the particular geographic region of interest.

In an alternative embodiment, the standard adoption curve may be based on an analogy to another geographic region with fundamental economic or demographic characteristics that are considered comparable to the other particular geographic region.

In step S14, the system 45 adjusts or handles the standard adoption curve consistent with the provision of an adjusted adoption curve based on the accepted user-specific input. The accepted user-specific input from step S10 is used preferably to adjust the standard adoption curve. For example, the application-tailoring module 36 adjusts the standard adoption curve based on a user input of a selected geographic region from a library of regions and a selected application from a library of applications. The standard adoption curve and the adjusted adoption curve may be composed of segments (curved or straight) placed end to end. Even a curve may be expressed or approximated as a group of straight line segments where the line segments are sufficiently short in length. Accordingly, the slope(s) of the adoption curve may be determined with reference to one or more of the straight line segments that approximate the standard adoption curve or the adjusted adoption curve.

The adjustment may include changing the slope(s) of one or more segments of the standard adoption curve, the saturation point of a standard adoption curve, or both. In one example, at least one segment of a standard adoption curve is changed from a standard slope to a revised slope of a revised standard adoption curve based on the user input of a specific country or geographic region. In another example, a saturation point is changed from a standard saturation point of the standard adoption curve to a revised saturation point on an adjusted adoption curve or the standard adoption curve based on the user's input of a specific application. In yet another example, the application-tailoring module 36 may increase or decrease the slope(s) of one or more segments of the standard adoption curve to yield an adjusted adoption curve that reflects the economic conditions of a particular geographic region or a country. The geographic regions or countries may be classified as more developed countries, less developed countries, more affluent countries, or less affluent countries, among other possible classifications.

The changing of the slope may entail the following procedure: The application-tailoring module 36 increases the slope(s) of one or more segments of the standard adoption curve to a revised slope or slopes of an adjusted adoption curve based on the user input of a more affluent region than average for deploying the enhanced wireless communication service. The application-tailoring module 36 decreases the slope(s) of one or more segments of the standard adoption curve to a revised slope or revised slopes of an adjusted adoption curve based on the user input of a less affluent region than average for deploying the enhanced wireless communication service.

In addition to modifying the slope of the adoption curve, the application tailoring module may lower a saturation point of the standard adoption curve to a revised saturation point on an adjusted adoption curve or the standard adoption curve based on the user input of a particular wireless application. The adjustment of the standard adoption curve may include establishing a maximum saturation point of adoption for an application that, in effect, prematurely truncates the standard adoption curve at some maximum level. The maximum saturation point indicates that the demand for the application of the enhanced wireless service has peaked and has a generally stagnant level of growth thereafter.

In a preferred embodiment, the application tailoring module 36 modifies or reshapes a standard adoption curve based one or more of the following attributes of an adoption curve:

(1) saturation point or curve truncation based on a specific selection of an application for deployment of the enhanced wireless communications service;

(2) slope(s) of the adoption curve based on the selection of a specific country or region for deployment of the enhanced wireless communications service;

(3) duration until a next generation of wireless communications service is introduced after the deployment of the enhanced wireless communications service in the specific country or region;

(4) selection of a pessimistic scenario, optimistic scenario, or a baseline scenario for the potential financial performance of the enhanced wireless communications service.

In step S15 after step S14, the financial analysis system 45 evaluates the user input, the general market data 12, and the adjusted adoption curve to estimate revenue per application, a cost per application, or both. For example, the revenue estimator 34 may estimate revenue per application based on the accepted user input, the general market data 12, and the adjusted adoption curve. As shown in FIG. 1, the revenue estimator 34 may estimate revenue based on user input from user input interface 22, general market data 12, revenue data 18 and the adjusted adoption curve. The cost estimator 32 may estimate cost per application based on the accepted user input, the general market data 12, and the adjusted adoption curve. As shown in FIG. 1, the cost estimator 32 may estimate cost based on user input from user input interface 22, cost data 14, cost data 16 and the adjusted adoption curve. The estimator 30 processes the general market data 12 to provide cost and revenue data for an application in the context of the adjusted adoption curve.

In step S16, the financial analysis system 45 presents a graphical depiction of a financial analysis based on the evaluation of the adjusted adoption curve, the general market data 12, and the accepted user input. The financial analyzer 42 accepts the estimated revenue and estimated costs as inputs from the estimator 30. The financial analyzer 42 provides a graphical depiction as an output based on the foregoing estimated revenue input and estimated cost input. The graphical depiction may include one or more of the following items:

1) a graph or chart of revenue of enhanced wireless communications services by market segment versus time;

2) a graph or chart of revenue of enhanced wireless communications services by geographic region versus time;

3) a graph or chart of revenue of enhanced wireless communications services by wireless application;

4) a graph or chart of cost of offering enhanced wireless communications services by market segment versus time;

5) a graph or chart of cost of offering enhanced wireless communications services by geographic region versus time;

6) a graph or chart of cost of offering enhanced wireless communications services by wireless application;

7) a textual or graphical summary of financial metrics, including a net present value (NPV), internal rate of return (IRR), or return on investment;

8) a cash flow production graph of enhanced wireless communications service versus time;

9) a chart or graph of a number of subscribers by application of the enhanced wireless service;

10) a chart or graph of a number of subscribers by market segment of the enhanced wireless service; and 11) a chart or graph depicting an analysis of the sensitivity of the net present value (NPV) calculation to key model variables (e.g. operating costs).

The constituent components of the financial analysis may be grouped into market segment analysis, cost analysis, revenue analysis, and financial metric analysis. The market segment analysis may represent a demographic breakdown of the customer base for the enhanced communications services. For example, the financial analyzer 42 may divide customers into at least two groups, such as business customers and consumers. The consumers may be further subdivided into adults and youth. The business customers may be divided into large businesses, medium businesses and small/home office businesses. The financial analyzer 42 may use general market data 12 to identify the number or percentage of subscribers per market segment. Accordingly, the method facilitates identification of key market segments for targeting advertising or particular application services that appeal to certain key market segments. Once market segments are defined, financial metrics may be associated with market segments for comparison. Financial metrics may include revenue per market segment, for example.

The revenue analysis may provide revenue per key customer or per market segment. The revenue analysis may include average revenue per user per month by customer segment on a year-by-year basis, starting from the year of deployment of the enhanced wireless communications services. The revenue analysis may be expressed as one revenue stream (or loss stream) associated with each corresponding application. A revenue stream per wireless application allows the service provider to rule out weak wireless applications with low or marginal profit margins. The revenue generation model may be based on subscription fee of subscribers for access to an application, advertising integrated into an application, a transactional fee associated with an application, a time-based or metered fee, an e-rent fee, or any combination of the foregoing. The user may elect certain revenue generation models for corresponding applications, or the system will select a default revenue generation model. The default revenue generation model and the permitted selection of a revenue generation model for a corresponding application may be based on research, empirical observations, industry experience, or the like. Research may include published reports or proprietary data gathered through field research or studies.

The cost analysis includes investment costs and operating costs. Investment costs for wireless infrastructure deployment and telecommunications equipment includes the cost of upgrading the network capability to handle the enhanced wireless communications services, the cost of upgrading the capacity of the network to handle the enhanced wireless communications services and potentially increased basic wireless service. The investment costs also include the service provider's costs of obtaining wireless applications and acquiring customers for wireless applications supported by the enhanced wireless services. The enhanced wireless communications services require interfaces, such as routers, for communicating over a communications network, such as the Internet.

Operating costs include the cost of maintaining and operating the network for the enhanced wireless communications services, the wireless applications, and managing customer relationships. Managing customer relationships may include sales, billing and technical support, for example. The cost analysis may be compared with the revenue analysis to determine wireless applications that produce better or worse returns based on differences in investment costs. The operational costs for applications may include the cost of providing, licensing, or otherwise procuring content required for certain applications.

The financial analysis may include or more of the following financial metrics: net present value (NPV), internal rate of return (IRR), return on investment (ROI), and payback period of the enhanced communications services. Net present value refers to the present value of future net cash flow of the enhanced wireless communications service over a certain period of time, where the initial investment in the enhanced wireless communications service is subtracted from the net present value. If a net present value is positive, than an investment is considered viable. Internal rate of return means the rate of return that applies when the present value of cash flow plus the final market value of the enhanced wireless service business equals the current market price for establishing the enhanced wireless service business. Return on investment means the income or profit that an investment provides during a certain time period. Net present value is expressed in a selected currency, internal rate of return may be expressed as a percentage, and return on income may be expressed as a percentage that is pretax and excluding depreciation of the wireless infrastructure.

In step S16, the financial analysis system 45 presents the determined financial content in a graphical manner that facilitates a convenient comparison of the economic and statistical factors that may be used to make informed business decisions. For example, the financial analysis 45 may be presented in a graphical format (e.g., as in FIG. 6-FIG. 8) that allows ready comparisons to be drawn for alternative planned offerings of enhanced wireless communications systems.

The service provider or user may generally use the financial analysis as a guide in making a well-informed decision on providing enhanced wireless communications service, the appropriate market entry points for offering enhanced wireless communications service and/or financing the procurement of telecommunications infrastructure related to the provision of enhanced wireless communications service. In one example, a service provider may select a preferential geographic region to offer an enhanced wireless service by comparing the graphical output (e.g., FIG. 6-FIG. 8) from executing the method of FIG. 4 first for one geographic region and again for another geographic region. In another example, a service provider may decide to offer certain more economically viable wireless applications, as opposed to offering less economically viable wireless applications, for a geographic region.

Figure 5:
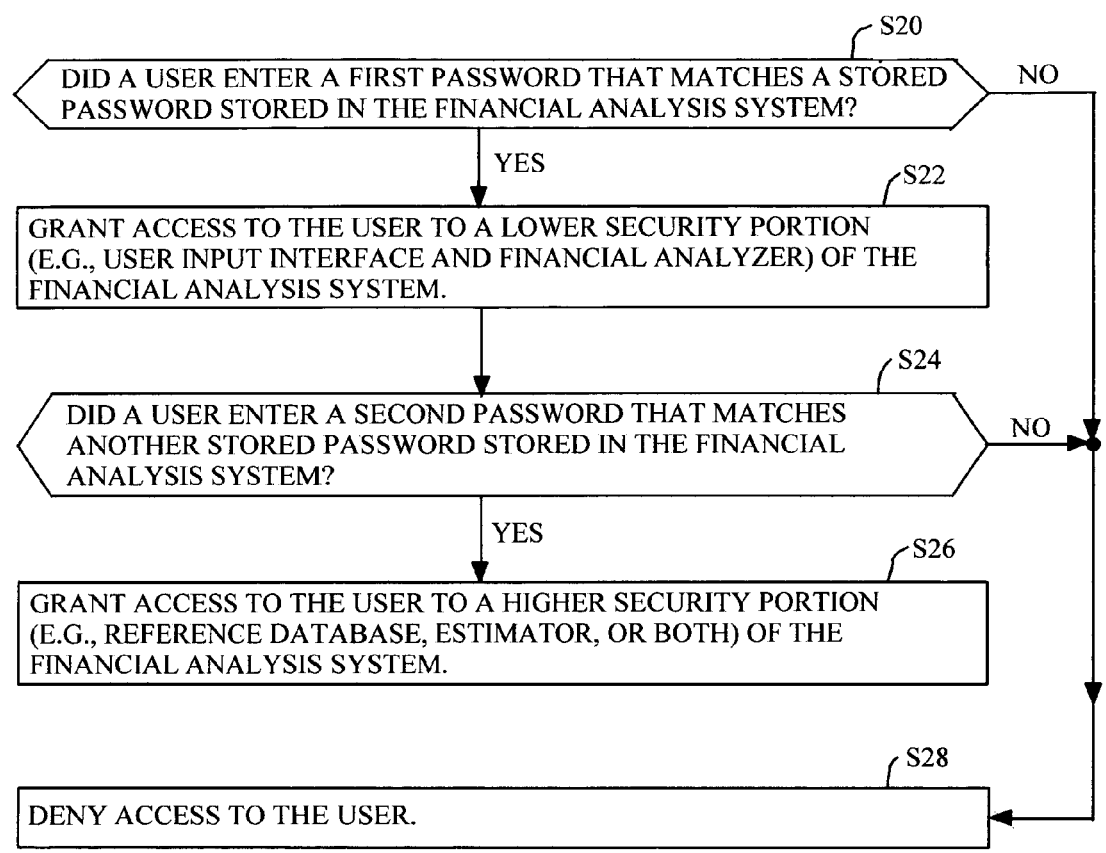
FIG. 5 is a flow chart of an illustrative security procedure associated with the financial analysis system of FIG. 1 in accordance with the invention.

FIG. 5 illustrates a security procedure associated with the method and system for financial analysis in accordance with the invention. The method of FIG. 5 facilitates the allocation of different levels of security to different portions of the financial analysis system 45 to provide at least a dual password barrier to critical program contents. Furthermore, the method supports various security enhancements, besides the dual password barrier, that protect the integrity of the underlying data and/or computations used in the financial analysis system 45. The method of FIG. 5 begins with step S20.

In step S20, the security manager 28 determines if a user entered a first password that matches a stored password in the financial analysis system 45. A system administrator may establish the stored password for the user. The first password may be defined as a combination of symbols, letters, or numbers.

If a security manager 28 determines the first password matches the stored password, then the method continues with step S22. Otherwise, the method continues with step S28.

In step S22, the security manager 28 grants access to the user to a lower security portion 44 of the financial analysis system. For example, a lower security portion 44 of the financial analysis system may include a user input interface 22, a financial analyzer 42, or both. With respect to the user input interface 22, the user's access may be limited to the ability to enter, select, and modify entries of the input data in the user input interface 22. With respect to the financial analyzer 42, the user's access may be limited to read-only access of the financial analysis.

In step S24 after step S22, a security manager 28 determines if a user entered a second password that matches another stored password within the financial analysis system. The second password may be defined as any combination of symbols, letters, or numbers that differs from the first password.

If a security manager 28 determines that the second password matches, then the method continues with step S26. Otherwise, the method continues with step S28.

In step S26, the security manager 28 grants access to the user to a higher security portion 40 of the financial analysis system. For example, a higher security portion 40 of the financial analysis system may include a reference database 10, an estimator 30, or both.

In step S28, the security manager 28 denies access to the user. The security manager 28 may treat the denial of access according to several alternative procedures. Under one procedure, users are able to re-attempt access to the module for an unlimited number of times. Under another procedure, if the security manager 28 has denied access to the same user during a predefined duration and if the failed access attempts exceed a minimum threshold, the security manager 28 logs the information on the failed attempts as an additional security measure.

Accordingly, the financial analysis system 45 may entail the use of multiple levels of password protection. At a first level of access, a user is granted access to the user input interface 22, the financial analyzer 42, or both upon the successful verification of a first password. At a second level of access, the user is granted access to the reference database 10 or a portion thereof, based upon successful verification of a second password.

The reference database 10 and the estimator 30 may be referred to as a higher security portion 40, whereas the user input interface 22 and the financial analyzer 42 may be referred to as the lower security portion 44 of the financial analysis system. The lower security portion 44, the higher security portion 40, or both may use other security enhancements in addition to the first and second passwords.

The security enhancements are preferably responsive to the entry of the first and second passwords such that the security enhancements do not interfere with a presentation of data to a user at a user interface upon entry of the proper first and second passwords into the financial analysis system 45. The security components 20 support the security enhancements under the direction of the security manager 28. The security enhancements may include encryption of the information in the reference database 10, the encryption of the executable instructions for the estimator 30, the hiding of files or other information in the reference database 10 from view by the user, the presence of read-only capability for the contents of the reference database 10 by the user, or other security measures that may protect against corruption or unwanted manipulation of the reference database 10. If the analysis system 45 is organized as a spreadsheet based program, the native password capabilities of the underlying spreadsheet program (e.g., Microsoft Excel spreadsheet program, where Microsoft and Excel are trademarks of Microsoft Corporation) may be arranged to provide some basic password-based security features. However, a spreadsheet-based program may not support one or more of the foregoing security enhancements.

Figure 6:
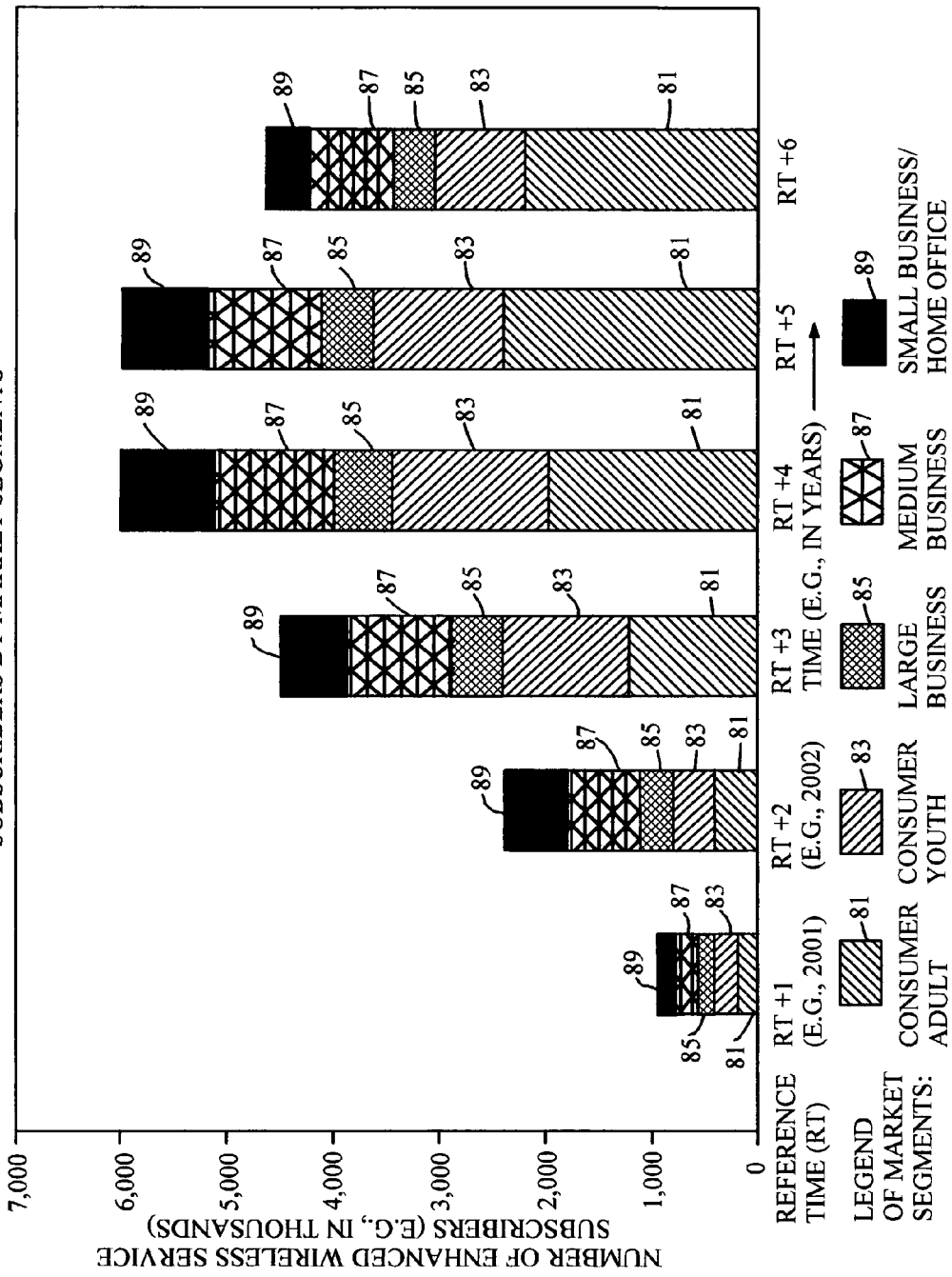
FIG. 6-FIG. 10 illustrate various graphical depictions of an exemplary financial analysis provided by the financial analyzer of FIG. 1 in accordance with the invention.

FIG. 6-FIG. 10 show parts of an illustrative financial analysis that may be provided by the financial analyzer 42 in accordance with the invention. For example, FIG. 6 shows the number of enhanced wireless service subscribers by market segment, on a year-by-year basis after the launch of the enhanced wireless service. The horizontal axis indicates time after a reference time (e.g., present year or time of introduction of the enhanced wireless communications service). One or more bars, which represent different market segments, may or may not be present for the reference time. Although the numbers of subscribers are provided in thousands and the date's progress in year long intervals, the example is provided for illustrative purposes and actual numbers of subscribers and the time organization may differ.

In general, the market segments may be defined in terms of business market segments, consumer market segments, or both. For example, business market segments may include large businesses, medium businesses, and small/home office businesses. Consumer market segments may include consumer adults and consumer youth. In an alternate embodiment, consumer adults or consumer youth may be subdivided into different groups based on an economic factor, such as income.

Figure 7:
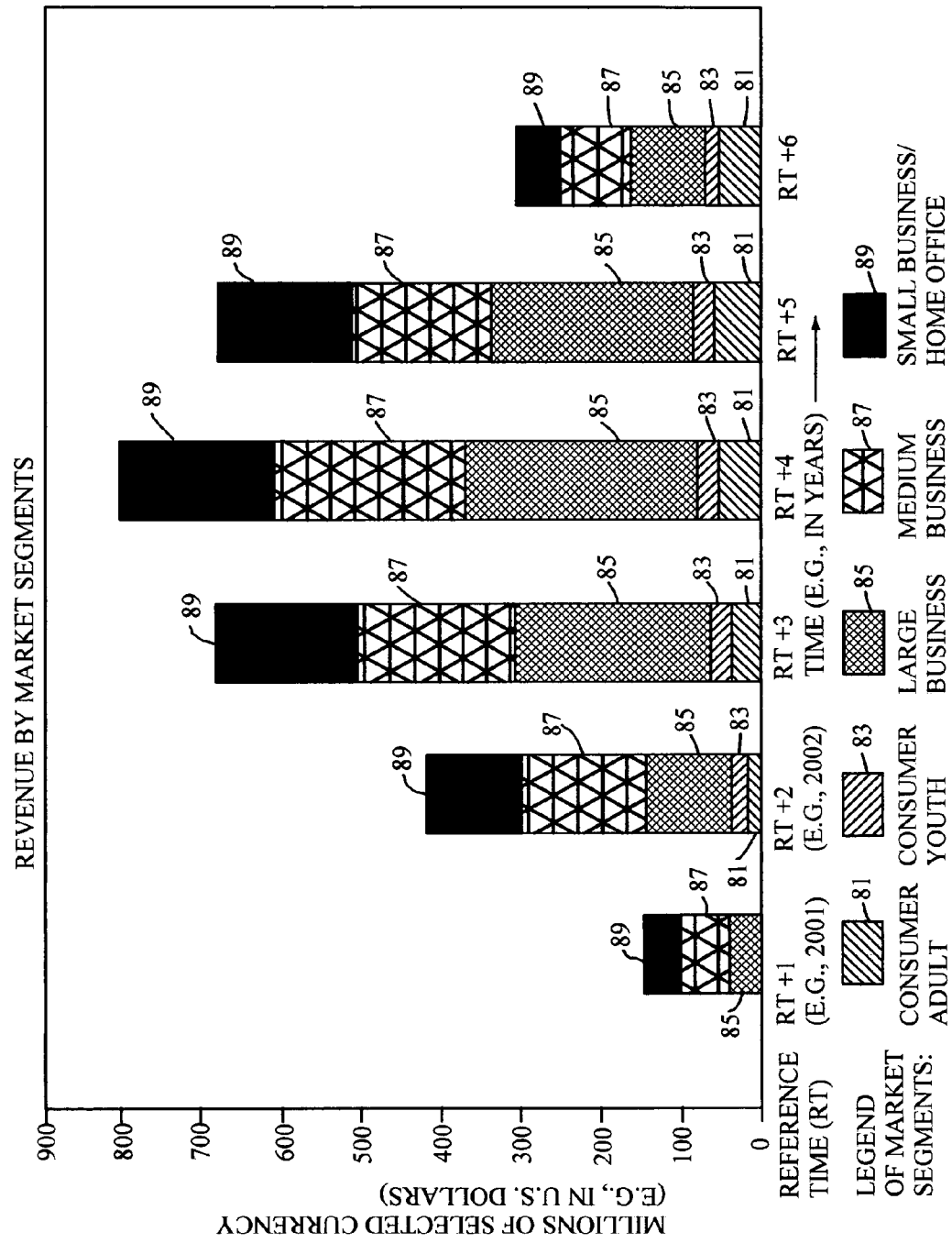

As shown in FIG. 6 and FIG. 7, the market segments include a consumer adult market segment 81, a consumer youth market segment 83, a large business market segment 85, medium business market segment 87, and small business/home office market segment 89. Each of the foregoing different market segments (i.e., 81, 83, 85, 87, and 89) is illustrated with different cross-hatch pattern or shading, as shown in the legend of FIG. 6. The relative share of each market segment is presented for purposes of an example and actual shares of each market segment will differ based on the characteristics of the enhanced wireless project at hand. Similarly, the definition of the market segments may differ with the enhanced wireless project at hand and the available underlying statistical data that supports various classifications of market segments.

FIG. 7 is similar to FIG. 6, except FIG. 7 shows revenue by market segments. Like reference numbers in FIG. 6 and FIG. 7 indicate like elements. The horizontal axis of FIG. 7 shows the reference year plus an integer number of years. The reference year may be selected to coincide with the present year or the year of deployment of the enhanced wireless services. The vertical axis includes millions in a selected currency.

Figure 8:
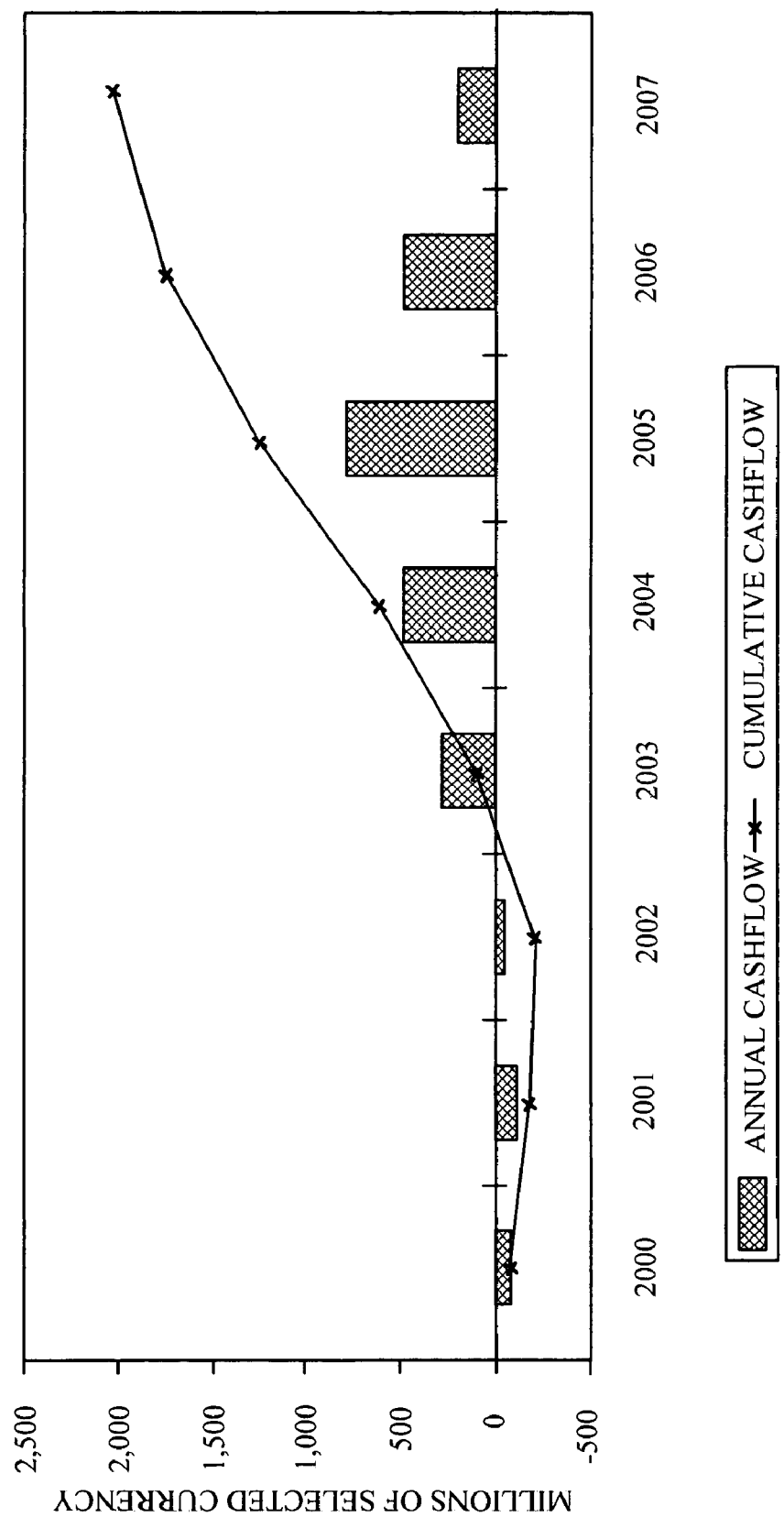

FIG. 8 shows a cash flow projection for the enhanced wireless service offering in accordance with the invention. The cumulative cash flow is shown as a graph, whereas the annual cash flow is shown as a bar chart. The vertical axis represents a certain amount of cash flow in a selected currency (e.g., in U.S. dollars) and the horizontal axis represents time (e.g., in selected intervals of years). Such a cash flow projection is a crucial tool for prudent financial planning related to the offering of enhanced wireless services. The bar chart format or another graphical format is preferably selected to make trends readily apparent to the user.

Figure 9:
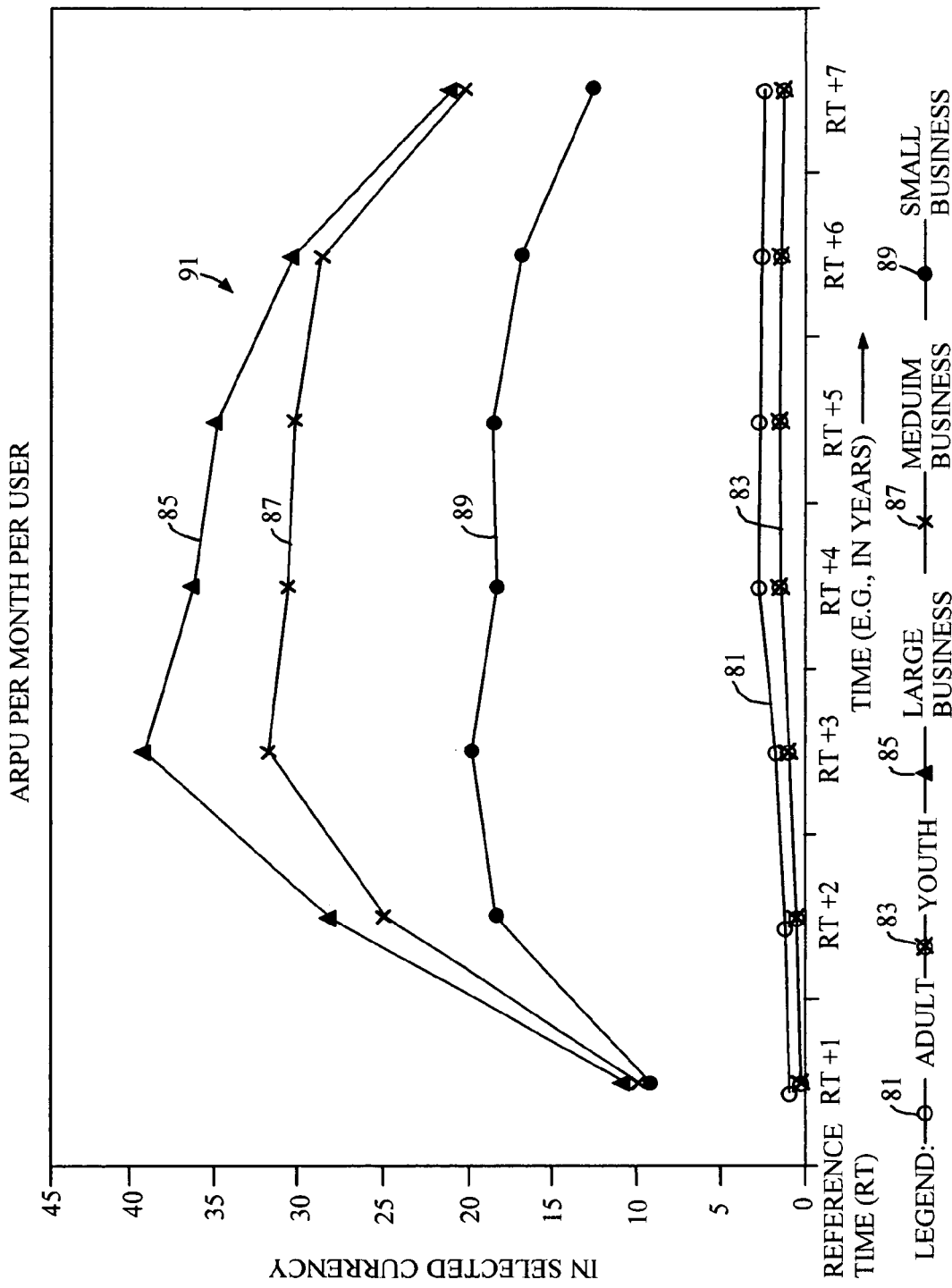

FIG. 9 is a graph that illustrates average revenue per user (ARPU) per a measured time interval (e.g., a month). The ARPU graph of FIG. 9 is one example of a financial analysis that may be provided by the financial analysis system 45 of the invention. The horizontal axis of FIG. 9 represents time with respect to a reference time (e.g., present year). The vertical axis of FIG. 9 represents average revenue per user per a measured time interval. The vertical axis may be expressed in dollars or another selected currency. The measured time interval may be a month, a week, a day, or another time period.

Each of the plotted lines or curves 91 of FIG. 9 represents the ARPU of a different market segment. Here, the market segments are divided into a consumer adult market segment 81, a consumer youth market segment 83, a large business market segment 85, a medium business market segment 87, and a small business/home office market segment 89. Although the large business market segment 85 contributes the greatest amount of average revenue per user over the entire time span of the horizontal axis as shown in FIG. 9, the relationship among each of the market segments of FIG. 9 is provided for illustrative purposes. The relationships among the curves 91 of an actual financial analysis will differ depending upon the particular circumstances at hand.

Figure 10:
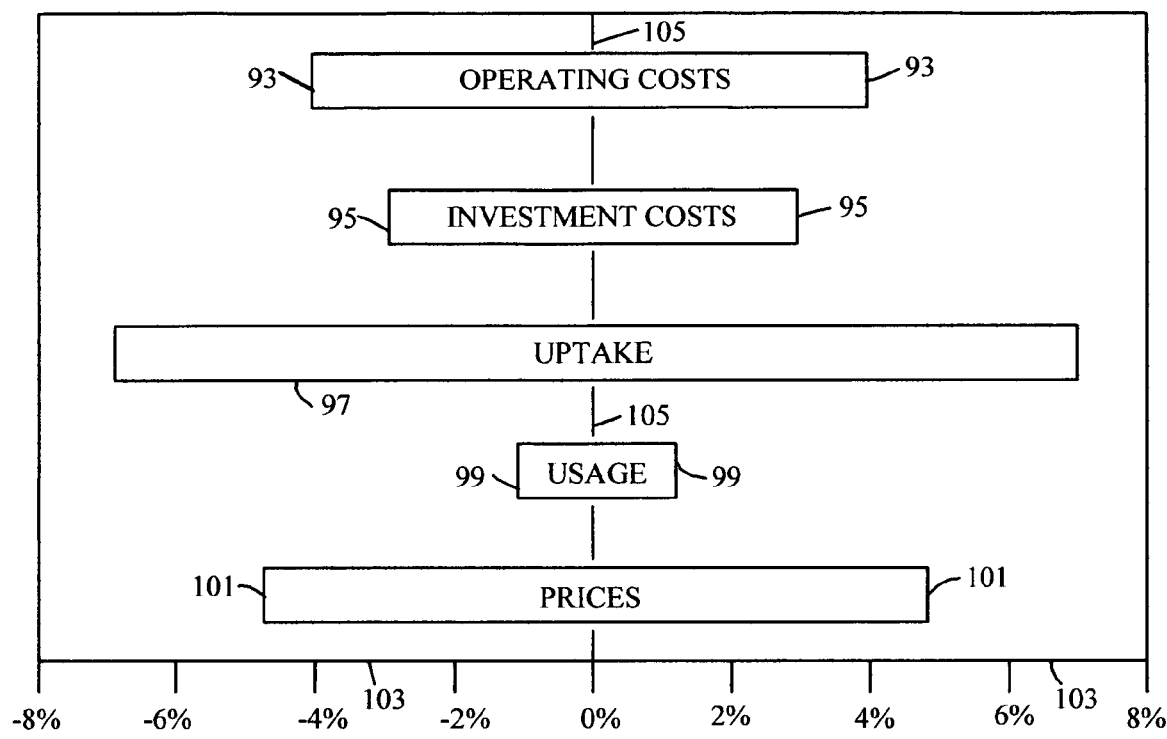

FIG. 10 is a sensitivity analysis bar graph that shows the sensitivity of the net present value of an enhanced wireless business to a change in one or more variable factors. The bar graph of FIG. 10 is one example of a financial analysis that may be provided by the financial analysis system 45 of the invention. The bar graph expresses a percentage change in net present value of an enhanced wireless service business based on a constant incremental percentage change (e.g., ten percent) in any one of a group of variable factors. The horizontal axis 103 of FIG. 10 shows a percentage change in net present value of a business based on the enhanced wireless service.

Along the centrally located vertical axis 105 of FIG. 10, five different bars of variable factors are presented. As shown in FIG. 10, the variable factors include operating costs 93 of the enhanced wireless service, investment costs 95 of the enhanced wireless service, uptake or market acceptance 97 of the enhanced wireless service, usage rate 99 of the enhanced wireless service, and price levels 101 for service offerings of the enhanced wireless service. The magnitude or horizontal length of each bar from the vertical axis 105 represents the constant incremental change in the variable factor.

An increase in the constant incremental change (e.g., +10 percent) in the variable factor is represented by the bar extending from one side of the vertical axis 105, a decrease in the constant incremental change (e.g., -10 percent) is represented by the bar extending from an opposite side of the vertical axis 105. To the right of the vertical axis 105, the variable factors of operating costs 93 and investment costs 95 are reduced, whereas the uptake 97, usage 99, and service sales prices 101 are increased. To the left of the vertical axis, the operating costs 93 and investment costs 95 are increased, whereas the uptake 97, usage 99, and sales prices 101 are reduced.

Each variable factor alone may impact the net present value. If more than one factor changes by the constant incremental change, the effect on the net present value is generally cumulative. Although FIG. 10 expresses the following sensitivity analysis, the actual sensitivity analysis will differ depending upon the financial and statistical inputs to the financial analysis system 45: First, for a ten percent decrease in operating costs 93, the net present value would increase by over four percent. Second, or a ten percent decrease in investment costs 95, the net present value would increase by almost percent. Third, for a ten percent increase in uptake 97, the net present value would increase by over seven percent. Fourth, for a ten percent increase in usage 99, the net present value would increase by approximately one percent. Fifth, for a ten percent increase in sales price 101, the net present value would increase by over four percent. In practice, the amount of impact of a change in a variable factor on the net present value is determined based on the selection of an adoption curve, an optimistic adoption curve, a pessimistic adoption curve, or any other inputs to the financial analysis system.

The sensitivity analysis may be used to mitigate risk in offering enhanced wireless service. The service provider can strive to adjust the variable factors to influence the net present value in a favorable manner that gives the most possible impact on net present value for the least expenditure or most feasible expenditure of resources.

Figure 11:
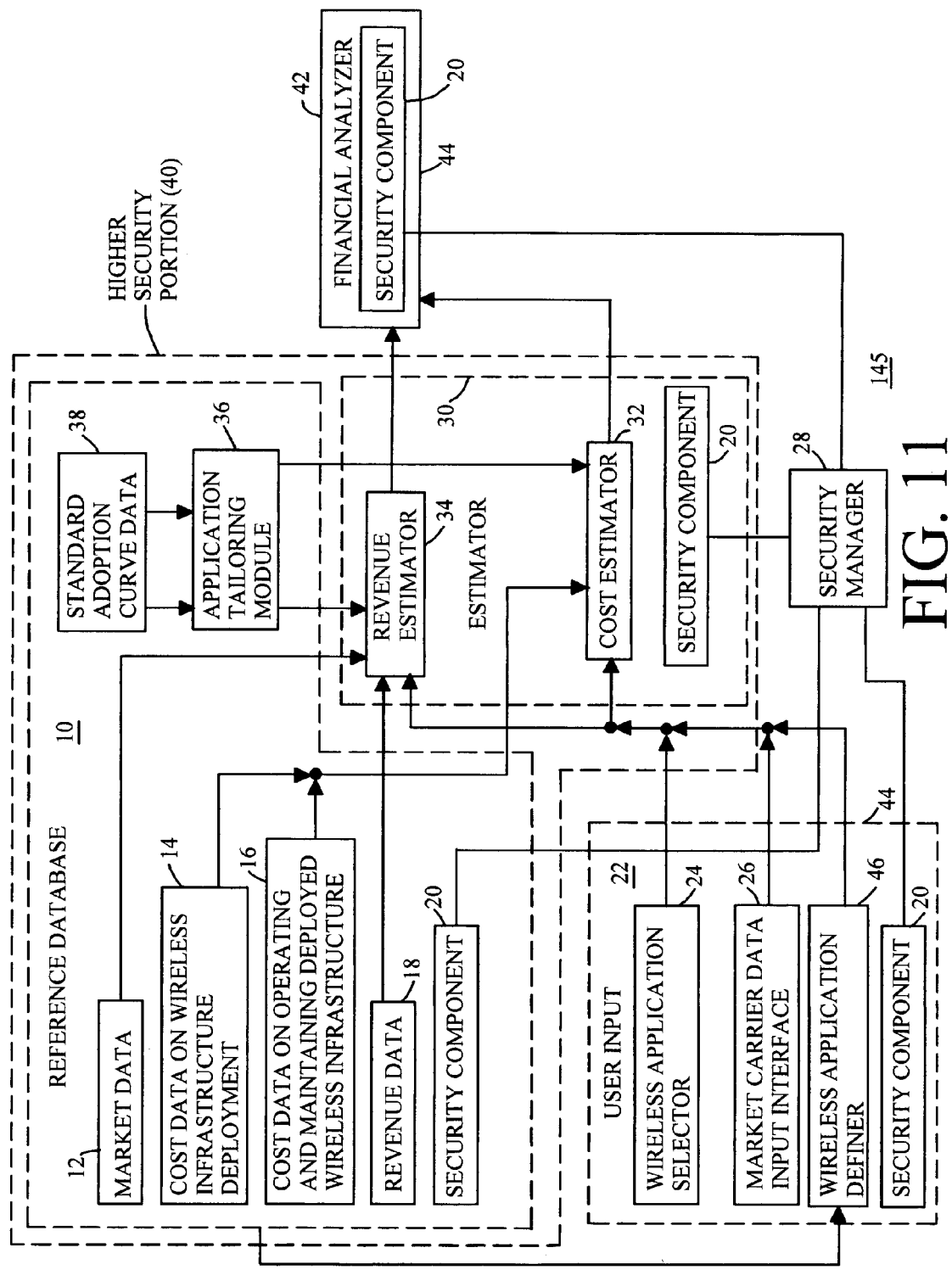
FIG. 11 is a block diagram of an alternative embodiment of a system for providing a financial analysis of an enhanced wireless communication service in accordance with the invention.

FIG. 11 shows an alternative embodiment of a system 145 for providing a financial analysis for an enhanced wireless communication system in accordance with the invention. The configuration of FIG. 11 is similar to the configuration of FIG. 1, except FIG. 11 includes a wireless application definer 46 that may be in communication with the reference database 10 and the estimator 30. Like reference numbers in FIG. 1 and FIG. 11 indicate like elements.

The wireless application definer 46 allows a user to define a custom application supported by the enhanced wireless communications service. Accordingly, the wireless application definer 46 enables a service provider to continue using the financial analysis system 145 and method of the present invention even after changes in the underlying technology or application offerings of the enhanced wireless service occur. The wireless application definer 46 promotes the longevity and flexibility of the financial analysis system of the invention.

The wireless application definer 46 preferable extracts required reference data from the reference database without compromising the security enforced by the security manager 28. The definer 46 uses input data from the reference database 10 and the user input interface 22 to produce a defined application. The estimator 30 can estimate revenue and costs for the defined application. Thus, the financial analysis system 45 and method allows a user to define a new custom application that is tailored to meet the user's specifications. The financial analysis system 145 has the flexibility to counter changes in technology that might otherwise tend to make the financial analysis system 145 and method obsolete.

The user may add applications without accessing the standard adoption curve, adjusted adoption curves, or other data that may distort results. The user may define new or custom applications that were not contemplated at the time the model was developed. Thus, the model remains viable even though technology continues to evolve. The defining of a new application may involve, determining the price of developing the application, determining the uptake or usage for each market segment. The model may provide an average usage per data, an average price per unit of use, costs of base subscribers, cost of adding incremental subscribers. The above information from the user input interface 22 and the reference database 10 is blended together to derive an adjusted market curve from a standard market adoption curve.

Figure 12:
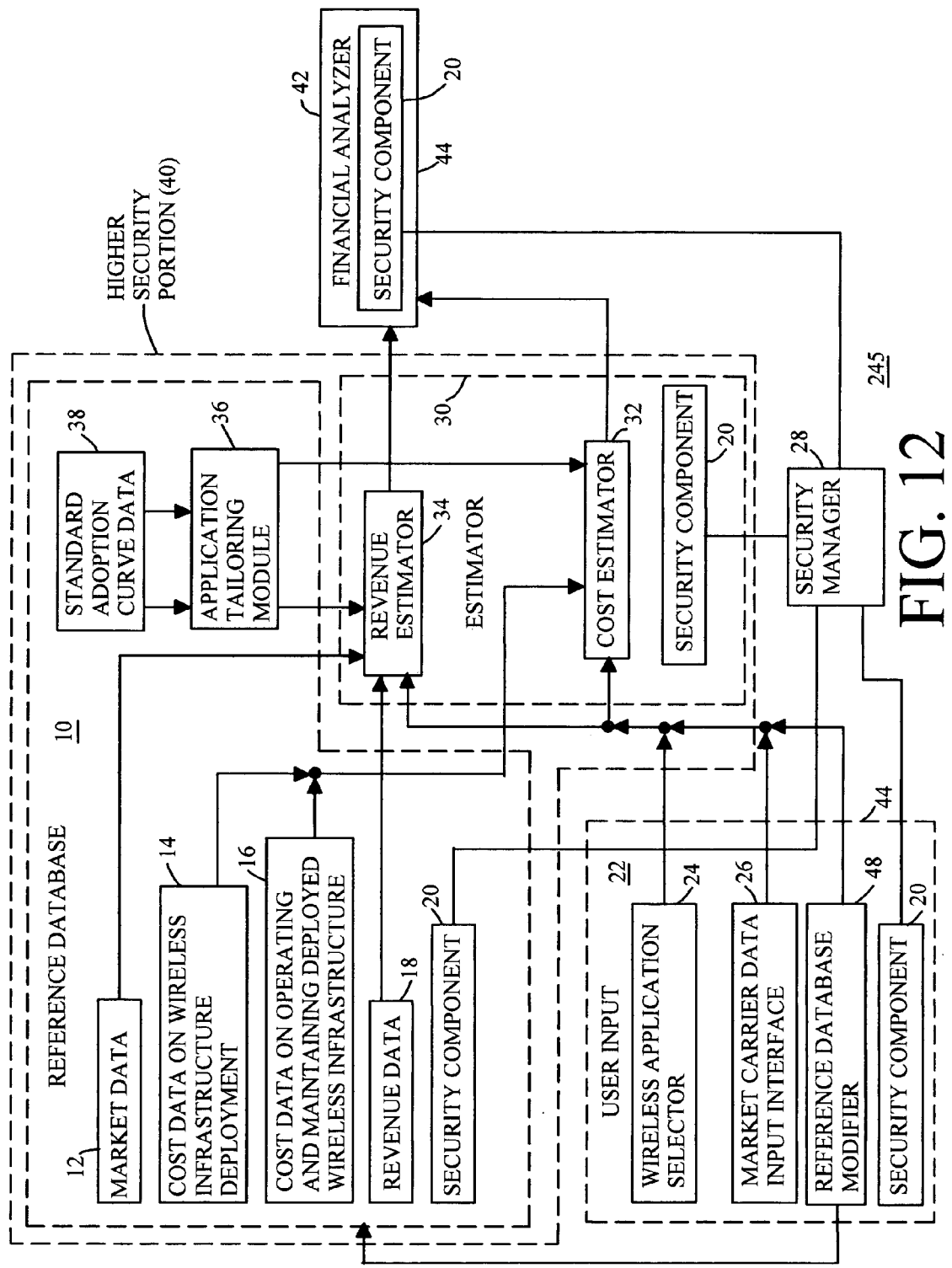
FIG. 12 is a block diagram of another alternative embodiment of a system for providing a financial analysis of an enhanced wireless communication service in accordance with the invention.

FIG. 12 shows another block diagram of an alternative embodiment of the system 245 and method for providing a financial analysis for an enhanced wireless communication service. The system 245 of FIG. 12 is similar to the configuration of FIG. 1 except the user input of FIG. 12 is equipped with a reference database modifier 48. Like reference numbers in FIG. 1 and FIG. 12 indicate like elements. The reference database modifier 48 allows modification of the reference database 10 after an appropriate security procedure has authenticated or validated a user's request for access to the higher security portion 40. For example, the reference database 10 modifier 48 supports modification after the user completes the security procedure of FIG. 5.

Modification of the reference database 10 may include modification of reference data stored in the database, deletion of reference data stored in the database, or the addition of new reference data to the database. The reference database modifier 48 allows a service provider to customize the reference database 10 based on the service provider's experience in the market and environment of providing communication service in a particular geographic region. Thus, the financial analysis can be fine tuned to be consistent with pragmatic feedback or actual field results.

The reference database modifier 48 is particularly useful in retaining the longevity and flexibility of the financial analysis system to evolve with changes in demographics or market data 12 that may make the market data 12 inapplicable under particular circumstances. Accordingly, the reference database modifier 48 facilitates the provision of an accurate financial tool for estimating the financial performance of a service provider of enhanced wireless communication services. The method and system 245 permits a user to vary market data 12 and vary applications to see the effects on the financial analysis. For more sophisticated users, the user may be authorized, with greater discretion, to change data stored in the reference database 10. The reference database 10 may be changed to reflect customer specifics or market specifics that are determined through actual observation of a particular market or historical experience with the business model.

The financial analysis system and method of the invention is well suited for providing a financial analysis of a proposed offering of an enhanced wireless communications service. A user of the financial analysis system may include a carrier seeking to upgrade an existing wireless communications system. Such a carrier may obtain revenue and cost information from the financial analysis for making an informed business decision in offering enhanced wireless communications services. The service provider may learn where to focus marketing efforts (e.g., on a specific market segment). The financial analysis is preferably presented in a graphical format that facilitates comparisons from year to year, from market segment to market segment, and from one wireless application to another. In an alternative embodiment, the financial analysis may be presented in a table or columnar textual format that facilitates comparisons between different proposed offerings of enhanced wireless communications services. Accordingly, the user can make an informed decision by viewing charts, graphics or another visual presentation produced by the financial analysis system.

The foregoing description of the method and system for providing a financial analysis for an enhanced wireless communication service describes several illustrative examples of the invention. Modifications, alternative arrangements, and variations of these illustrative examples are possible and may fall within the scope of the invention. Accordingly, the following claims should be accorded the reasonably broadest interpretation, which is consistent with the specification disclosed herein and not unduly limited by aspects of the preferred embodiments disclosed herein.

The invention claimed is:

1. A method for providing a financial analysis for an enhanced wireless communications service, the method comprising:

accepting user-specific input into a computer relating to an existing wireless communications service and the enhanced wireless communications service, wherein the user-specific input includes a wireless application selection for selecting at least one wireless application supported by the enhanced wireless communications service and a market data input interface for entering existing data about the existing wireless communications service;

accessing a reference database including general market data applicable to the enhanced wireless communications service and a standard adoption curve for adoption of the enhanced wireless communications service, wherein the market data comprises at least one of demographic or financial data, wherein the reference database further includes a first set of cost data values associated with a wireless infrastructure deployment cost and a second set of cost data values associated with an operations and maintenance cost for the enhanced wireless communications service, wherein the reference database further includes a revenue data value associated with the existing wireless communications service;

adjusting the standard adoption curve to obtain an adjusted adoption curve, wherein the adjusted adoption curve is responsive to chances in a parameter associated with the standard adoption curve and selected from the group consisting of a geographic region, a slope and a saturation point;

estimating at least one potential revenue value associated with the at least one wireless application, wherein estimating comprises generating at least one revenue estimate based on the accepted user-specific input, the revenue data value, the general market data and the adjusted adoption curve, and wherein estimating further comprises generating at least one cost estimate based on the first set of cost data values, the second set of cost data values and the adjusted adoption curve;

generating a financial analysis, wherein the financial analysis is selected from a group consisting of net present value (NPV), internal rate of return (IRR), return on investment (ROI) and payback period; and presenting a graphical depiction of the financial analysis based on an evaluation of the at least one potential revenue value, the adjusted adoption curve, the general market data, the first set of cost data values, the second set of cost data values and the revenue data value.

2. The method according to claim 1 wherein the adjusting comprises:

adjusting the standard adoption curve based on a user input of a selected geographic region from a library of regions and a selected application from a library of applications of the enhanced wireless communications service.

3. The method according to claim 1 wherein the adjusting comprises:
changing a slope from the standard adoption curve to a revised slope of the adjusted adoption curve based on a user input of a specific geographic region.

4. The method according to claim 1 wherein the adjusting comprises:
changing a saturation point from the standard adoption curve to a revised saturation point of the adjusted adoption curve based on a user input of a specific application.

5. The method according to claim 1 wherein the adjusting comprises:
increasing a slope from the standard adoption curve to a revised slope of the adjusted adoption curve based on a user input of a more affluent region than average for deploying the enhanced wireless communications service.

6. The method according to claim 1 wherein the adjusting comprises:
decreasing a slope from the standard adoption curve to a revised slope of the adjusted adoption curve based on a user input of a less affluent region than average for deploying the enhanced wireless communications service.

7. The method according to claim 1 wherein the adjusting comprises:
lowering a saturation point from the standard adoption curve to a revised saturation point on the standard adoption curve and based on a user input of a particular application.

8. The method according to claim 1 further comprising:
assigning a first level of security for a user with respect to the presenting and the accepting and assigning a second level of security higher than the first level of security with respect to the user being capable of modifying content of the reference database.

9. The method according to claim 1 further comprising:
estimating revenue of the enhanced wireless communications service within a geographic region based on the accepted user-specific input and the adjusted adoption curve.

10. The method according to claim 1 further comprising:
estimating cost of the enhanced wireless communications service within a geographic region based on the accepted user-specific input and the adjusted adoption curve.

11. The method according to claim 1 wherein the presenting comprises providing a graphical depiction selected from the group consisting of a revenue by a market segment graph, a cash-flow projection graph, number of subscribers by application of the enhanced wireless service, and number of subscribers by market segment.

12. The method according to claim 1 wherein the financial analysis comprises a sensitivity analysis showing sensitivity of net present value of a business based on the enhanced wireless communications service to a change in at least one variable factor.

13. The method according to claim 12 wherein the at least one variable factor is selected from the group consisting of operating costs of the enhanced wireless communications service, investment costs of the enhanced wireless communications service, market uptake of the enhanced wireless communications service, usage rate of the enhanced wireless communications service, and price level for service offerings of the enhanced wireless communications service.

14. The method according to claim 1 wherein the financial analysis comprises a bar chart of different variable factors potentially impacting net present value of a business based on the enhanced wireless communications service, the variable factors presented as horizontally extending bars along a vertical axis, a respective percentage change in the net present value for a corresponding incremental constant change in a variable factor indicated by a horizontal length of the bar from the vertical axis.

15. The method according to claim 1 wherein the financial analysis comprises a graph of average revenue per user per a measured time interval, the graph including a group of plotted lines representing said average revenue per user within different market segments versus time.

16. The method according to claim 15 wherein the market segments include an adult market segment, a youth market segment, a large business market segment, a medium business market segment, and a small business market segment.

17. A system for developing a business model for an enhanced wireless communications service, the system comprising:
a storage device containing a reference database including general market data for the enhanced wireless communications service and a standard adoption curve for adoption of the enhanced wireless communications service, where the reference database further includes a first cost data value associated with a wireless infrastructure deployment cost and a second cost data value associated with an operations and maintenance cost for the enhanced wireless communications service, where the reference database further includes a revenue data value associated with an existing wireless communications service;
a user input interface for accepting user-specific input relating to an existing wireless communications service and the enhanced wireless communications service, wherein the user-specific input includes a wireless application selection for selecting at least one wireless application supported by the enhanced wireless communications service and a market data input interface for entering existing data about the existing wireless communications service;
an application tailoring module for modifying the standard adoption curve to obtain an adjusted adoption curve, wherein the adjusted adoption curve is responsive to changes in a parameter associated with the standard adoption curve and selected from the group consisting of a geographic region, a slope and a saturation point;
an estimator adapted to access the reference database and to receive the user-specific input to perform a financial analysis associated with the enhanced wireless communications service as a function of the user-specific input, the first cost data value, the second cost data value, the adjusted adoption curve and the revenue data value, the estimator for generating an estimated revenue value and an estimated cost value;
a financial analyzer that generates a financial analysis, wherein the financial analysis is selected from the group consisting of net present value (NPV), internal rate of return (IRR), return on investment (ROI) and payback period; and
wherein the financial analyzer presents a graphical depiction of the financial analysis.

18. The system according to claim 17 wherein the application tailoring module includes an adoption curve adjuster for adjusting the standard adoption curve based on a user input of a selected geographic region from a library of regions and a selected application from a library of applications.

19. The system according to claim 17 wherein the application tailoring module changes a slope from the standard adoption curve to a revised slope of the adjust adoption curve based on the user input of a specific country.

20. The system according to claim 17 wherein the application tailoring module changes a saturation point from the standard adoption curve to a revised saturation point of the standard adoption curve and the adjusted adoption curve based on a user input of a specific application.

21. The system according to claim 17 wherein the application tailoring module increases a slope from the standard adoption curve to a revised slope of the adjusted adoption curve based on the user input of a more affluent region than average for deploying the enhanced wireless communications service.

22. The system according to claim 17 wherein the application tailoring module decreases a slope from the standard adoption curve to a revised slope of the adjusted adoption curve based on a user input of a less affluent region than average for deploying the enhanced wireless communications service.

23. The system according to claim 17 wherein the application tailoring module lowers a saturation point from the standard adoption curve to a revised saturation point of the standard adoption curve based on a user input of a particular application of the wireless communications service.

24. The system according to claim 17 further comprising a security manager for assigning a first level of security for a user with respect to the user input interface and assigning a second level of security higher than the first level of security with respect to the user being capable of modifying content of the reference database.

25. The system according to claim 17 wherein the estimator generates the estimated revenue value as a function of a geographic region based on the accepted user-specific input and the adjusted adoption curve.

26. The system according to claim 17 wherein the estimator generates the estimated cost value as a function of a geographic region based on the accepted user-specific input and the adjusted adoption curve.

27. The system according to claim 17 wherein the financial analyzer depicts a graphical representation of the financial analysis selected from the group consisting of a revenue by market segment graph, a cash-flow projection graph, number of subscribers by application of the enhanced wireless communications service, number of subscribers by market segment, a graph showing sensitivity of net present value to a variable factor, and a graph of average revenue per user within different market segments.

28. The method according to claim 1, wherein the parameter is the geographic region.

29. The method according to claim 1, wherein the parameter is the slope.

30. The method according to claim 1, wherein the parameter is the saturation point.

31. The system according to claim 17, wherein the parameter is the geographic region.

32. The system according to claim 17, wherein the parameter is the slope.

33. The system according to claim 17, wherein the parameter is the saturation point.

* * * * *

UNITED STATES PATENT AND TRADEMARK OFFICE
CERTIFICATE OF CORRECTION

PATENT NO. : 7,343,334 B1
APPLICATION NO. : 09/580233
DATED : March 11, 2008
INVENTOR(S) : Richard I. Adduci, Jr. et al.

It is certified that error appears in the above-identified patent and that said Letters Patent is hereby corrected as shown below:

In column 16, line 9, after "may include" insert --one--.

In column 16, line 18, before "an investment" delete "than" and substitute --then-- in its place.

In column 20, line 4, before "a ten percent" delete "or" and substitute --for-- in its place.

Signed and Sealed this

Thirtieth Day of December, 2008

JON W. DUDAS
*Director of the United States Patent and Trademark Office*